United States Patent
Deka et al.

(10) Patent No.: US 12,520,067 B2
(45) Date of Patent: Jan. 6, 2026

(54) CONCEPT FOR A CENTRAL UNIT AND A DISTRIBUTED UNIT IN A POINT-TO-MULTIPOINT NETWORK

(71) Applicants: Dhruba Deka, Bangalore (IN); Gert Schedelbeck, Munich (DE)

(72) Inventors: Dhruba Deka, Bangalore (IN); Gert Schedelbeck, Munich (DE)

(73) Assignee: Intel Corporation, Santa Clara, CA (US)

( * ) Notice: Subject to any disclaimer, the term of this patent is extended or adjusted under 35 U.S.C. 154(b) by 360 days.

(21) Appl. No.: 18/001,289

(22) PCT Filed: Jul. 6, 2021

(86) PCT No.: PCT/IB2021/000466
§ 371 (c)(1),
(2) Date: Dec. 9, 2022

(87) PCT Pub. No.: WO2022/008974
PCT Pub. Date: Jan. 13, 2022

(65) Prior Publication Data
US 2023/0239599 A1    Jul. 27, 2023

Related U.S. Application Data

(60) Provisional application No. 63/050,152, filed on Jul. 10, 2020.

(51) Int. Cl.
*H04Q 11/00* (2006.01)
(52) U.S. Cl.
CPC . *H04Q 11/0067* (2013.01); *H04Q 2011/0064* (2013.01)
(58) Field of Classification Search
CPC ............... H04Q 11/0067; H04Q 2011/0064
See application file for complete search history.

(56) References Cited

U.S. PATENT DOCUMENTS

2015/0319028 A1* 11/2015 Razmtouz ........... H04J 14/0298
398/67
2017/0279527 A1*  9/2017 Kim .................. H04Q 11/0067
(Continued)

FOREIGN PATENT DOCUMENTS

CN      112995802 A  *  6/2021   ......... H04Q 11/0067
EP       3537628 A1     9/2019
(Continued)

OTHER PUBLICATIONS

ITU-T G.987.3: "10-Gigabit-capable passiveoptical networks (XG-PON): Transmission convergence (TC) layer specification", (Jan. 2014).
(Continued)

*Primary Examiner* — Pranesh K Barua
(74) *Attorney, Agent, or Firm* — 2SPL Patent Attorneys PartG mbB; Kieran O'Leary

(57) ABSTRACT

Various examples relate to a central unit and a corresponding method and computer program, to a distributed unit and a corresponding method and computer program, to an optical line terminal comprising a central unit, to an optical networking unit comprising a distributed unit, and to a system comprising a central unit and one or more distributed units. The central unit for a time-division multiplexed (TDM) point-to-multipoint (P2MP) network comprises circuitry configured to grant, during a first time window, a first distributed unit not yet registered to the TDM P2MP network to transmit first activation data to the central unit. The circuitry is configured to grant, during the first time window, at least one second distributed unit already registered to the TDM P2MP to transmit upstream data to the central unit. The central unit is configured to receive the first activation data during the first time window. The central unit is configured to determine an estimate for a round-trip time of the first distributed unit based on the first activation data and (Continued)

a length of a second time window based on the estimate for the round-trip time. The circuitry is configured to grant exclusively the first distributed unit to transmit second activation data to the central unit during the second time window. The circuitry is configured to register the first distributed unit to the TDM P2MP network based on the second activation data.

22 Claims, 10 Drawing Sheets

(56) References Cited

U.S. PATENT DOCUMENTS

| | | | |
|---|---|---|---|
| 2020/0366400 A1* | 11/2020 | Lin | H04J 14/0236 |
| 2021/0400365 A1* | 12/2021 | Zhang | H04L 1/0083 |

FOREIGN PATENT DOCUMENTS

| | | |
|---|---|---|
| EP | 3860142 A1 | 8/2021 |
| WO | 2020063583 A1 | 4/2020 |

OTHER PUBLICATIONS

ITU-T G.987.3: "10-Gigabit-capable passive optical networks (XG-PON): Transmission convergence (TC) layer specification", Amendment 1 (Mar. 2020).

ITU-T G.9807.1: "10-Gigabit-capable symmetric passive optical network (XGS-PON)", Amendment 2, (Mar. 2020).

ITU-T draft G.9804.3: "Higher Speed Passive Optical Networks: Common Transmission Convergence Layer Specification (G.hsp.comTC)", draft from Feb. 2020.

Nokia's FSAN contribution "RAN Applications", FSAN meeting, Dallas, Apr. 2018.

ETRI, Mitsubishi, NTT, Sumitomo, ITU-T contribution: "Quiet window opening in TDM-PON using CTI to G.hsp.comTC and G.989.3", ITI-T meeting in Geneva, Feb. 2020.

* cited by examiner

CONCEPT FOR A CENTRAL UNIT AND A DISTRIBUTED UNIT IN A POINT-TO-MULTIPOINT NETWORK

FIELD

Various examples relate to a central unit and a corresponding method and computer program, to a distributed unit and a corresponding method and computer program, to an optical line terminal comprising a central unit, to an optical networking unit comprising a distributed unit, and to a system comprising a central unit and one or more distributed units.

BACKGROUND

In Point-to-Multipoint (P2MP) topologies with Time Division Multiplexing (TDM), a Central Unit (CU) may transmit continuously in downstream to a variety of Distributed Units (DU). In the opposite upstream direction, the transmission from the various distributed units may be time-division multiplexed. That means that each DU can transmit in upstream only during a certain timeslot (upstream burst). The CU may co-ordinate and allocate the upstream bursts to each distributed units to avoid collisions between distributed units.

The activation of a new DU on a TDM P2MP medium can be facilitated by a "quiet window". To avoid collisions between an activation response from the new DU and the regular transmissions from the active distributed units, the CU may open a so-called quiet window to temporarily suppress upstream transmission by the active distributed units. During a quiet window, the new DU can initialize and register to the P2MP medium.

For example, the standards for transmission over Passive Optical Networks (PON), such as G.987.3/XG-PON and G.9807.1/XGS-PON) specify the creation of a quiet window in upstream to enable a new Optical Network Unit (ONU) to request a serial number from the Optical Line Termination (OLT). The OLT measures in the quiet window the round-trip delay for delay equalization of the ONU ("Ranging"). However, the transmission latency of other, active distributed units may be increased by the duration of the quiet window.

Since the distributed units may be located at various distances on the P2MP medium, the response from the new DU may arrive at an unknown point in time at the CU, depending on the actual round-trip time. Since the round-trip is not known a priori to the CU, the CU may open a quiet window that is long enough to cover the maximum allowed spread of DU distances on the P2MP medium. PON standards may require for instance quiet windows of 250 µs (for an ODN with a differential fiber distance of 20 km) and 450 µs (for an ODN with a differential fiber distance of 40 km) for serial number acquisition. Such huge additional latency may be unacceptable for latency sensitive applications, as for instance mobile transport.

In other approaches, the quiet window can be eliminated by an additional physical transmission channel. For example, an additional physical transmission channel may be used to initialize and register a new DU to the P2MP medium. Consequently, the normal transmission channel is not delayed by the quiet window. For instance, an additional physical transmission channel on a PON can be realized by a dedicated activation wavelength (DAW, $\lambda_{DA}$). Such procedures are described in detail e.g. in an ITU recommendation for High-Speed PON (ITU-T draft G.9804.3: "Higher Speed Passive Optical Networks: Common Transmission Convergence Layer Specification (G.hsp.comTC)". However, an additional physical transmission channel might not always be available. Additional TX and RX components for the additional physical transmission channel may increase cost and complexity.

In some approaches, the quiet window is minimized by an additional logical transmission channel. The additional logical transmission channel may be used to initialize and register a new DU to the P2MP medium. Then the normal transmission might not be delayed by a quiet window. For instance, an additional logical transmission channel on a PON can be realized by a low-speed and low power transmission over the same wavelength channel with special "localization sequences". Such procedures are described in detail e.g. in the Nokia's FSAN contribution (Nokia's FSAN contribution "RAN Applications", FSAN meeting, Dallas, April 2018). However, an additional logical transmission channel may increase complexity and require measures beyond legacy transmit and receive techniques. Furthermore, the low transmission speed may increase the detection time In another approach, special arrangements of transmission opportunities on the P2MP medium may be used. With special arrangements of transmission opportunities on the P2MP medium the CU may attempt to open the quiet window at a point in time when the impact of increased latency is acceptable for the other distributed units. In this case, the CU needs to account for bandwidth and service requirements of all distributed units from higher layer applications. For instance, a special arrangement of transmission opportunities on a PON can be implemented as outlined in ETRI, Mitsubishi, NTT, Sumitomo, ITU-T contribution: "Quiet window opening in TDM-PON using CTI to G.hsp-.comTC and G.989.3", ITI-T meeting in Geneva, February 2020. However, such arrangements of transmission opportunities are not always possible, e.g., if the bandwidth utilization of the P2MP medium is high and unused timeslots are sparse or too short.

There may be a desire for an improved activation on P2MP media with TDM.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
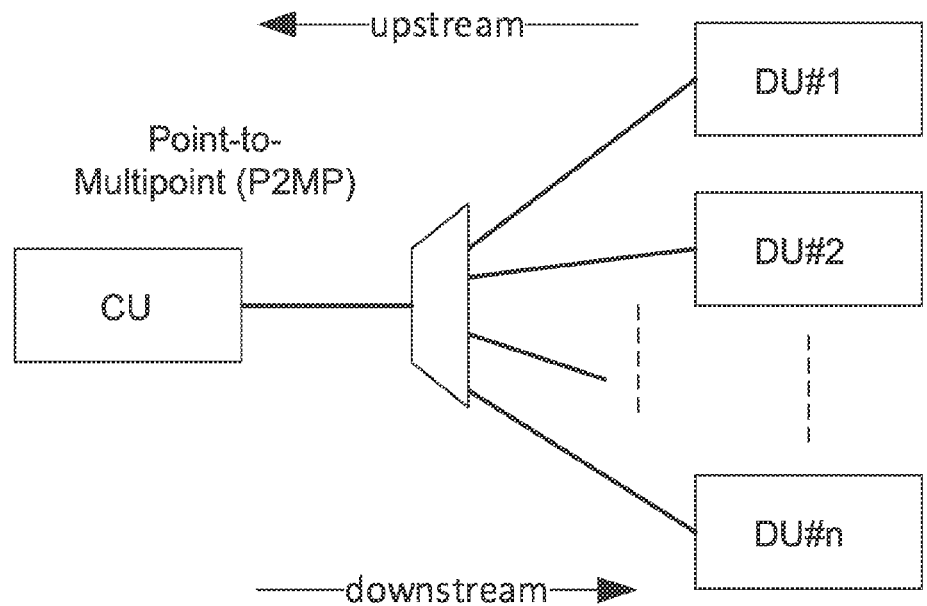
FIG. 1 shows an example of a topology of a point-to-multipoint medium.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

The proposed concept is applicable to access technologies with point-to-multipoint topology (P2MP) and time-division multiplexing (TDM). Examples relate to a two-part activation method with an initial noise window and subsequent shortened quiet window on point-to-multipoint media with time-division multiplex. In other words, the proposed concept provides a two-part activation with a noise window on P2MP media.

In P2MP topologies with TDM that are considered in the present disclosure, the Central Unit (CU) transmits continuously in downstream to a variety of Distributed Units (DU). FIG. 1 shows an example of a topology of a point-to-multipoint medium. FIG. 1 shows the central unit CU, which is connected to a plurality of distributed units DU #1-DU #N via a splitter. In the opposite upstream direction, the transmission from the various distributed units is time-division multiplexed. That means that each distributed unit can transmit in upstream only during a certain timeslot (upstream burst). The central unit coordinates and allocates the upstream bursts to each distributed units to avoid collisions between distributed units.

In some concepts, the activation of a new distributed unit on a TDM P2MP medium can be facilitated by a "quiet window". To avoid collisions between an activation response from the new DU and the regular transmissions from the active distributed units, the CU opens a so-called quiet window to temporarily suppress upstream transmission by the active distributed units. During the quiet window, the new DU can initialize and register to the P2MP medium.

Figure 3:
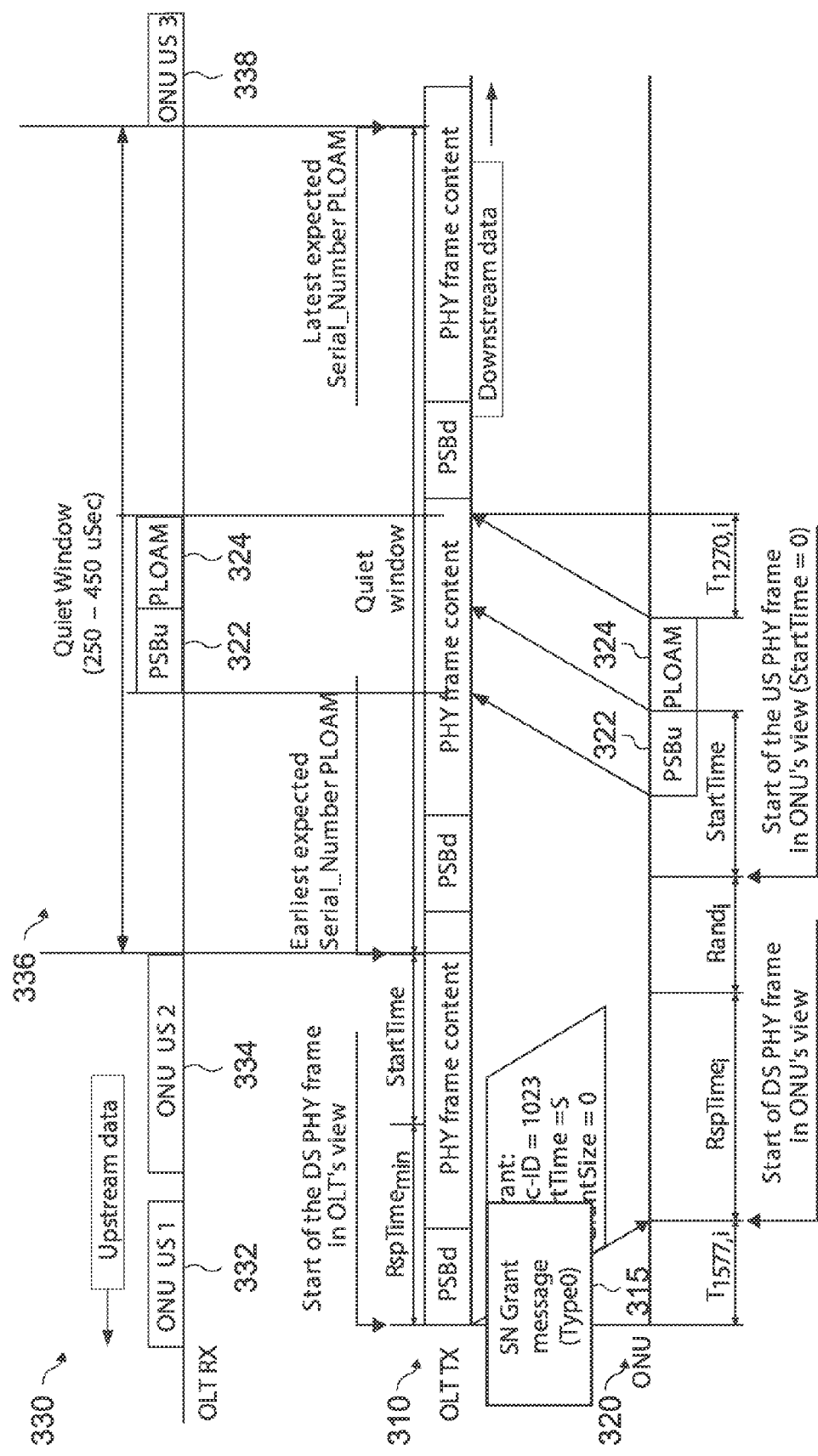
FIG. 3 shows a schematic diagram of timing relationships during serial number acquisition that is based on a long quiet window.

For example, as also shown in FIG. 3, the standards for transmission over Passive Optical Networks (PON) specify the creation of a quiet window in upstream to enable a new Optical Network Unit (ONU) to request a serial number from the Optical Line Termination (OLT). The OLT measures in the quiet window the round-trip delay for delay equalization of the ONU ("Ranging"). The detailed procedures are described for instance in chapter 13 of the PON standards G.987.3/XG-PON, and similarly in chapter C.13 from G.9807.1/XGS-PON. However, the transmission latency of other, active distributed units may be increased by the duration of the quiet window.

Since the distributed units may be located at various distances on the P2MP medium, the response from the new distributed unit arrives at an unknown point in time at the central unit, depending on the actual round-trip time. Since the round-trip is not known a priori to the central unit, the central unit may open a quiet window that is long enough to cover the maximum allowed spread of distributed unit distances on the P2MP medium. Legacy PON standards require for instance quiet windows of 250 µs (for an ODN (Optical Data Network) with a differential fiber distance of 20 km) and 450 µs (for an ODN with a differential fiber distance of 40 km) for serial number acquisition. Such huge additional latency may be unacceptable for latency sensitive applications, as for instance mobile transport.

In the following, a concept is proposed that may reduce the latency caused by the activation procedure of as-of-yet unregistered distributed units.

Figure 2C:
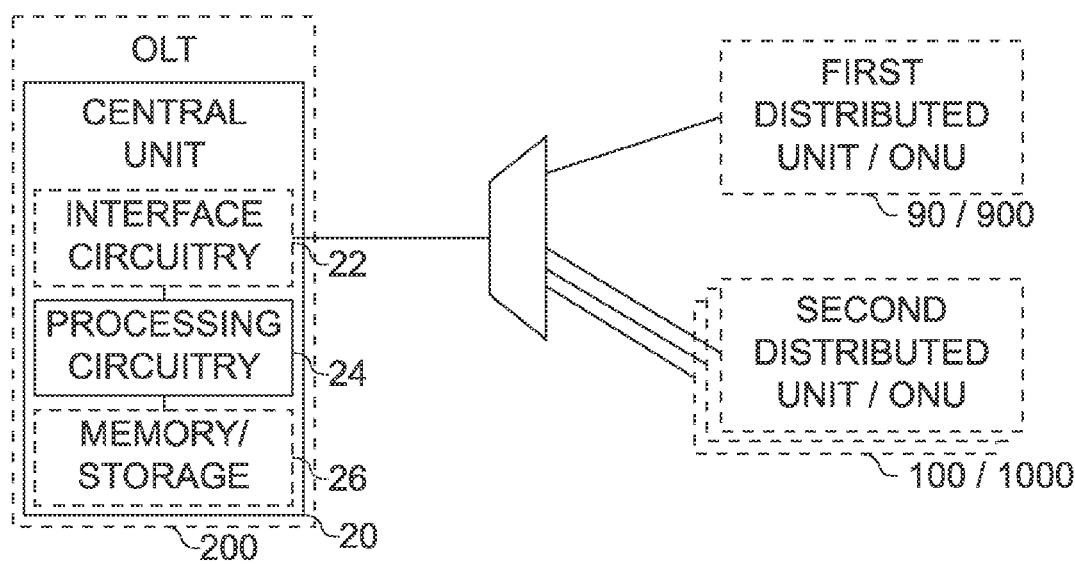
FIG. 2c shows a block diagram of an example of a central unit, an optical line terminal comprising a central unit, and a system comprising an optical line terminal and one or more optical networking units.
Figure 2A:
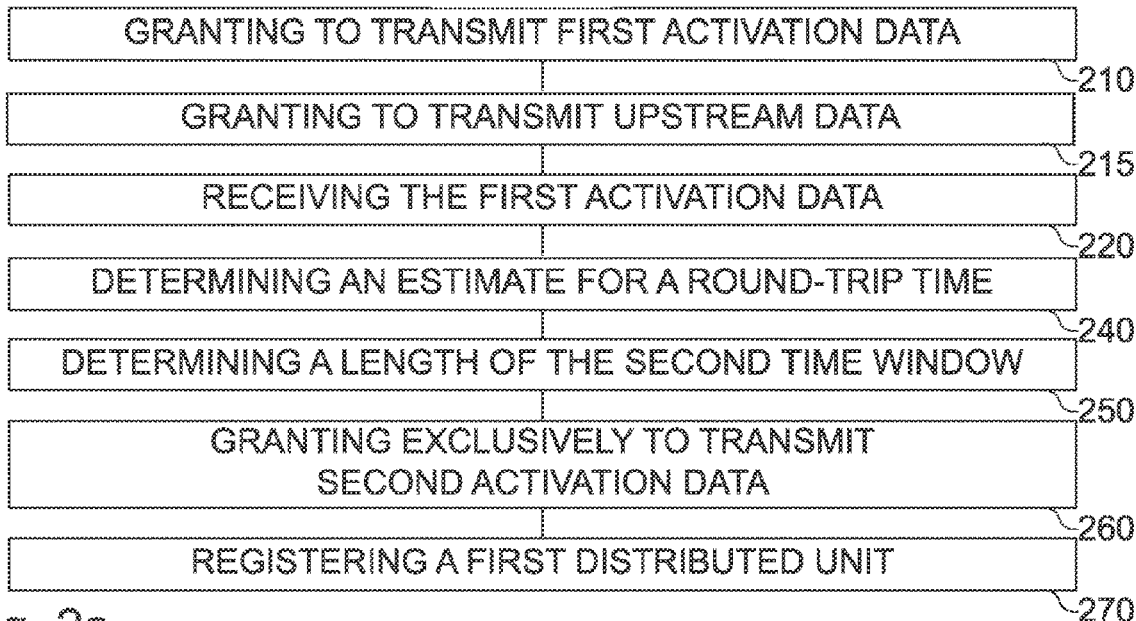
FIGS. 2a and 2b show flow charts of an example of a method for a central unit.
Figure 2B:
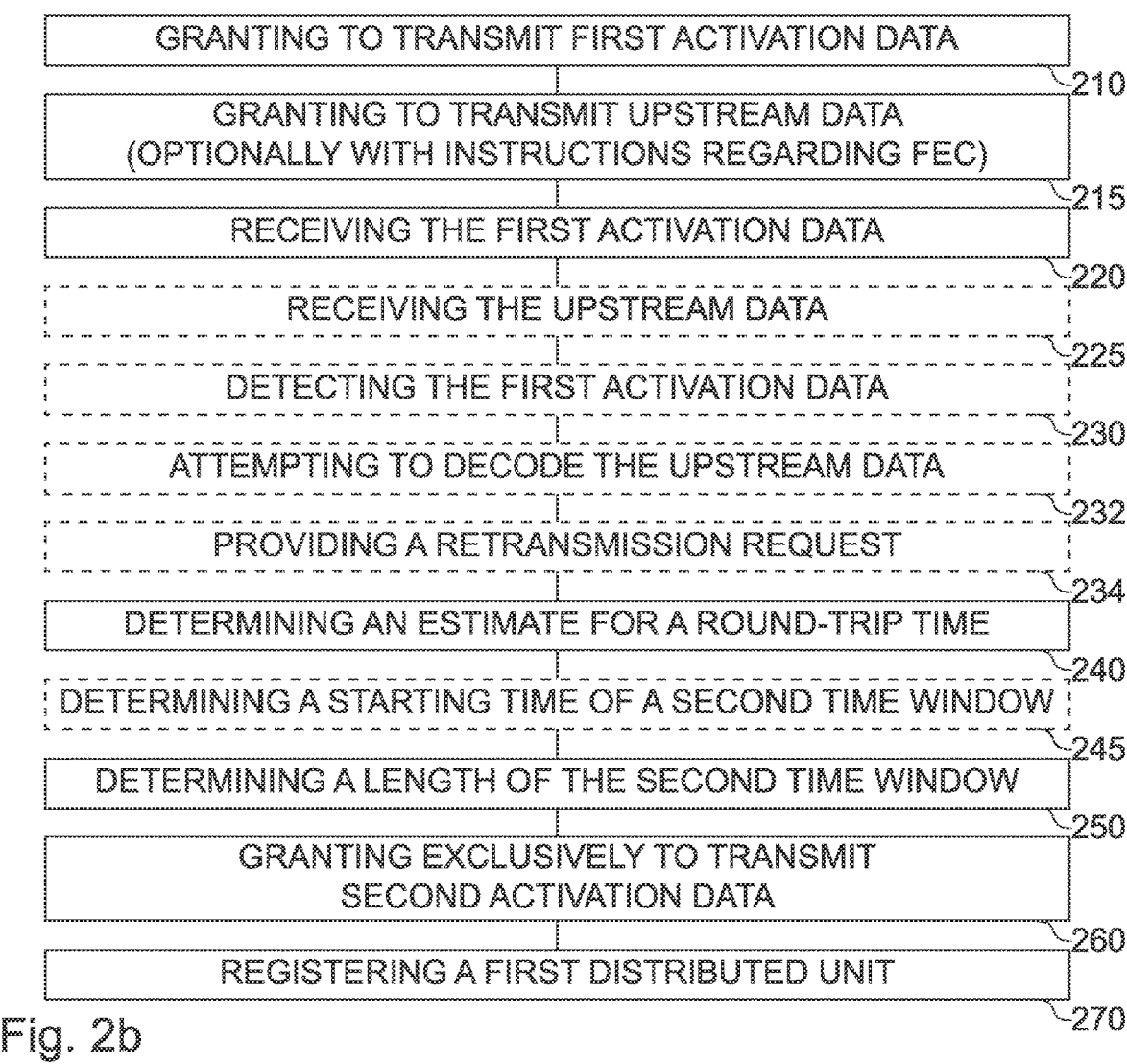

FIGS. 2*a* and 2*b* show flow charts of an example of a method for a central unit 20 (shown in FIG. 2*c*) of a time-division multiplexed (TDM) point-to-multipoint (P2MP) network. The method comprises granting 210, during a first time window, a first distributed unit 90 not yet registered to the TDM P2MP network to transmit first activation data to the central unit 20. The method comprises granting 215, during the first time window, at least one second distributed unit 100 already registered to the TDM P2MP network to transmit upstream data to the central unit 20. The method comprises receiving 220 the first activation data during the first time window. The method comprises determining 240 an estimate for a round-trip time of the first distributed unit 90 based on the first activation data. The method comprises determining 250 a length of a second time window based on the estimate for the round-trip time. The method comprises granting 260 exclusively the first distributed unit 90 to transmit second activation data to the central unit 20 during the second time window. The method comprises registering 270 the first distributed unit 90 to the TDM P2MP network based on the second activation data. For example, the method may be performed by the central unit 20, e.g., the central unit 20 introduce in connection with FIG. 2*c*.

FIG. 2*c* shows a block diagram of an example of a central unit 20, an optical line terminal 200 comprising the central unit 20, and a system comprising the optical line terminal 200 with the central unit and one or more optical networking units 900; 1000 (comprising the first distributed unit 90 and the at least one second distributed unit 100, respectively). The central unit 20 comprises circuitry or means, configured to provide the functionality of the central unit. For example, the circuitry or means may be configured to perform the method of FIG. 2*a* and/or 2*b*. For example, the central unit may comprise processing circuitry 24 or, more generally, means for processing 24, which may be configured to perform the functionality of the central unit. Additionally, the preamble central unit may comprise interface circuitry 22 and memory/storage circuitry 26, or, more generally, means for communicating 22 and means for storing information 26, and which may be used for transmitting and receiving information, and for storing and retrieving information, respectively. In the following, if the central unit is configured to perform an action, the respective action may be performed by the respective circuitry of means of the central unit, or by the corresponding method or computer program.

The circuitry/means (e.g., the processing circuitry/means for processing) is configured to grant (e.g., via the interface circuitry/means for communicating), during the first time window, the first distributed unit 90 not yet registered to the TDM P2MP network to transmit first activation data to the central unit 20. The circuitry/means (e.g., the processing circuitry/means for processing) is configured to grant (e.g., via the interface circuitry/means for communicating), during the first time window, the at least one second distributed unit 100 already registered to the TDM P2MP to transmit upstream data to the central unit 20. The circuitry/means (e.g., the processing circuitry/means for processing) is configured to receive (e.g., via the interface circuitry/means for communicating) the first activation data during the first time window. The circuitry/means (e.g., the processing circuitry/means for processing) is configured to determine the estimate for the round-trip time of the first distributed unit 90 based on the first activation data, and to determine the length of a second time window based on the estimate for the round-trip time. The circuitry/means (e.g., the processing circuitry/means for processing) is configured to grant (e.g., via the interface circuitry/means for communicating) exclusively the first distributed unit 90 to transmit second activation data to the central unit 20 during the second time window. The circuitry/means (e.g., the processing circuitry/means for processing) is configured to register the first distributed unit 90 to the TDM P2MP network based on the second activation data.

In various illustrative examples of the present disclosure, the TDM P2MP network may be a Passive Optical Network (PON). Accordingly, the central unit may be, or may be included in, an Optical Line Terminal (OLT) of the PON. The first and second distributed units may be, or may be included in, Optical Network Units (ONUs) of the PON. FIG. 2*c* thus further shows an optical line terminal 200 comprising or corresponding to the central unit 20. FIG. 2*c* further shows a PON system comprising the OLT 200 (with the central unit 20) and one or more optical networking units 900; 1000 (comprising the first distributed unit 90 and the least one second distributed unit 100). However, the proposed concept is not limited to PON. Alternatively, the proposed concept may be applied to other TDM P2MP networks, such as coaxial cable-based TDM P2MP networks.

For the sake of simplicity, the concept is illustrated with respect to the circuitry of the central unit. Features introduced in connection with the circuitry of the central unit may likewise be applied to the corresponding means, method and computer program.

Various examples of the present disclosure relate to a central unit, and to a corresponding method and computer program for the central unit. The proposed concept is based on the finding, that the activation and registration of a distributed unit that is not yet registered to the central unit, and thus the PDM P2MP network, can be split into a two-part process, while avoiding the need for a long "quiet window", which may reduce the latency incurred by the at least one second distributed unit.

Therefore, the proposed concept defines two time windows—a first time window, which is also denoted "noise window", and which may have a length that is similar to the "quiet window" used in other concepts, and a second time window, which is also denoted "shortened quiet window", and which may be shorter than the first time window, and therefore also shorter than the quiet window used in other systems. During the first time window, the first distributed unit 90, which is to be registered with the central unit and TMD P2MP network, is granted permission to transmit the first activation data. At the same time, at least one second distributed unit 100 is also granted permission to transmit during the first time window. In particular, the at least one second distributed unit 100 is granted permission to transmit upstream data bursts during the first time window (potentially with increased FEC redundancy). If both the first and the at least one second distributed unit transmit their respective upstream transmissions at the same time, the first activation data of the first distributed unit is (at least partially) superimposed over the upstream data of the at least one second distributed unit (unless the first distributed unit transmits within a guard band between two upstream data bursts of the at least one second distributed unit). While attempting to decode the upstream data, the central unit may detect the increase in the error rate, and may thus detect the first activation data as noise being superimposed on the upstream data. Based on the placement of the detected noise, the central unit determines a coarse round-trip time of transmissions between the central unit and the first distributed unit. In this context, the "round-trip time" may include a random delay time being introduced by the first distributed unit for collision avoidance with transmissions of other previously unregistered distributed units. Once the central unit has detected the noise, and thus the first activation data, the central unit grants the first distributed unit permission to transmit the second activation data in the second time window. In contrast to the transmission of the first activation data during the first time window, the second time window is granted exclusively to the first distributed unit for transmitting the second activation data. The second activation data may include the serial number (or other identification information) of the first distributed unit and, optionally, a duration of the random delay time. The central unit registers the first distributed unit based on the second activation data, e.g., by transmitting a third message to the first distributed unit. Additionally, based on the receipt of the second activation data, which is (ideally) not superimposed over transmission by other distributed units, and optionally based on the knowledge of the random delay time, the central unit may perform a more precise estimation of the round-trip time between the central unit (also denoted ranging). Alternatively, the ranging may be performed based on subsequent transmission between the central unit and the first distributed unit.

In the following, the first part of the activation procedure is introduced in more detail—the transmissions during the first time window (i.e., the "noise window"). The central unit grants the first distributed unit to transmit the first activation data to the central unit during the first time window. In general, the grant for transmitting the first activation data might not be directed specifically at the first distributed unit. Instead, the grant to transmit the first activation data may be provided for any distributed unit that is not yet registered to the TDM P2MP network. Additionally, the central unit grants the at least one second distributed unit to transmit upstream data (bursts) during the first time window. To be precise—the respective grants are transmitted before the first time window. The respective grants permit the respective distributed units to transmit during the first time interval.

For example, the first distributed unit and the at least one second distributed unit may be granted the respective transmission by transmitting grant messages to the distributed units. For example, the circuitry may be configured to grant, during the first time window, the first distributed unit 90 to transmit the first activation data to the central unit 20 by transmitting a first grant message over the TDM P2MP network (which is received at least by the first distributed unit). For example, the first grant message may comprise data indicating the first time window. For example, the data indicating the first time window may indicate, that the first time window is opened. In some examples, the data indicating the first time window may further indicate a timing (e.g., a start and an end) of the first time window relative to an upstream frame to be transmitted in response to the grant, or relative to the receipt of the downstream frame comprising the first grant message.

For example, data may be transmitted between the central unit and the distributed unit using so-called frames. A frame may comprise one or more of at least one preamble, at least one header and payload data. The payload data may be sub-divided into codewords, with each codeword comprising (or being followed by) forward error correction data. In downstream direction, the entire downstream frame is generated by the central unit and transmitted to the distributed units. In upstream direction, different distributed units may contribute to the upstream frame. In other words, different portions of the upstream frame may be transmitted by different distributed units, with a guard band being inserted between the contributions of the different distributed units. Additionally, each contribution by a distributed unit may be prefaced by a preamble. The central unit may grant the distributed units to contribute a portion of the frame, e.g., using a so-called bandwidth (BW) map. The first time window may specify a portion of an upstream frame to be transmitted from the distributed units to the central unit. Accordingly, the central unit may be configured to grant the at least one second distributed unit to transmit during the first time window by including the at least one second distributed unit in the bandwidth map during a portion of the frame that intersects with the first time window. The start and/or end of the first time window (and similarly of the second time window) may be defined relative to the start of the downstream frame comprising the first grant message or relative to the upstream frame comprising the first time window. An illustration of timing between the transmission of the first activation data and the upstream data (bursts) by the at least one second distributed unit relative to the first time window is given in FIG. 4.

During the first time window, the first activation data and the upstream data are received by the central unit. For example, the circuitry may be configured to receive the first activation data together with the upstream data of the at least one second distributed unit 100 during the first time window. Accordingly, the method may comprise receiving 225 the upstream data together with the first activation data. As the first activation data and the upstream data are transmitted during the same time, there is a high likelihood that both are received by the central unit at the same time. Moreover, the first activation data and the upstream data may be received (and transmitted) via the same channel. In other words, the circuitry may be configured to receive the first activation data of the first distributed unit 90 and the upstream data of the at least one second distributed unit 100 via the same channel of the TDM P2MP network. Therefore, the first activation data may be at least partially superimposed over the upstream data when it is received by the central unit.

Due to the superposition, instead of using payload data for the first activation data, the first activation data may comprise a predetermined signal pattern, such as a noise pattern. In other words, the first activation data may be a predetermined data pattern, such as a noise pattern, that is received at least partially superimposed on the upstream data of the at least one second distributed unit 100. The noise pattern may be transmitted by the first distributed unit on the same channel of the P2MP medium as the normal signals. In case of PON, the noise pattern might not require an additional, special wavelength, and hence might not require additional optical components. The noise pattern does not need embedded information like ONU ID. It could be any pattern that is easily/reliably "detectable" (ease of noise generation), as for instance an alternating pattern or a preamble pattern. For example, the predetermined data pattern may be one of a preamble pattern and an alternating pattern. For example, the noise pattern may be composed of continuous, short and strong noise, that corrupts max. two FEC codewords with high probability of corruption, or of repeated, friendly, low power noise, such as a Comb signal, with a high probability of correction by forward error correction.

The noise pattern, or more generally the first activation data, is detected by the central unit. For example, the circuitry may be configured to receive the upstream data from the at least one second distributed unit 100, and to detect the first activation data superimposed over the upstream data of the at least one second distributed unit 100. In particular, the first activation data, e.g., the noise pattern, may be detected by performing error detection on the upstream data, e.g., using forward error correction data included in the upstream data. For example, the circuitry is configured to detect the first activation data by detecting errors within the upstream data transmitted by the at least one second distributed unit 100. The error detection may be performed while decoding (or attempting to decode) the upstream data. In other words, the circuitry may be configured to attempt to decode the upstream data being superimposed with the first activation data. Accordingly, the method may comprise attempting 232 to decode the upstream data being superimposed with the first activation data. For example, the decoding of the upstream data may comprise performing error detection and/or error recovery using a FEC correction. As part of the FEC-based error detection/recovery, an error rate or an indicator regarding the error intensity may be determined by the algorithm being used for error detection or recovery. If the error rate or error intensity surpasses a threshold, the first activation data may be deemed detected by the central unit. For example, LDPC iterative decoding may be used for forward error correction. In LDPC iterative decoding, a syndrome is calculated, with the number of ones included in the syndrome indicating the error intensity. The sum of the number or ones in the syndrome, which is called the "weight" of the syndrome, may thus be used to detect the first activation data.

Once the noise is detected, the payload data of the at least one second distributed unit may be corrected, e.g., by the above-reference FEC (using for instance Reed-Solomon or LDPC coding). To increase the robustness against the noise, the error correction capabilities built into the upstream data may be increased relative to other upstream data bursts outside the first time window. For example, the circuitry may be further configured to instruct the at least one second distributed unit 100 to transmit the upstream data with increased error correction capabilities (increased relative to other upstream data bursts being transmitted outside the first time window) to the central unit 20 during the first time window. Accordingly, the method may further comprise instructing 215 the at least one second distributed unit 100 to transmit the upstream data with increased error correction capabilities to the central unit 20 during the first time window. Measures for increasing the probability of correction may include the use of a new burst profile, making the codeword more "robust" for correction (i.e., by decreasing the code rate). For example, the at least one second distributed unit may be instructed to use an increased number or parity bits or to shorten the payload of the upstream data relative to other upstream data bursts being transmitted outside the first time window.

A number of other techniques for mitigation of the noise impact by noise pattern may be used. For example, codeword repetition may be used. During a noise window, the at least one second distributed unit may repeat codewords several times within an upstream data burst so that the noise pattern does not corrupt all codewords. In other words, the circuitry may be configured to instruct the at least one second distributed unit to repeat codewords during the first time window. Additionally or alternatively, the central unit may grant only upstream data with a high Quality of Service requirement (e.g., latency-sensitive data) during a noise window to reduce the upstream payload bandwidth requirement so that the spare bandwidth can be used for error correction. Additionally or alternatively, the central unit may grant smaller upstream grants during the noise window, such that the retransmission buffer requirement on the distributed unit side is reduced or minimized.

Additionally or alternatively, the signal level being used for the noise pattern may be adapted. For example, the signal level of the noise pattern may be set to normal full transmit power level. In other words, a received signal level of the upstream data may be at most 20% larger or smaller than a received signal level of the first activation data. A maximal variation between the nearest and the furthest distributed unit from the central unit may be limited, so that the signal level of the special activation signal (i.e., the first activation data) should be strong enough to corrupt any other upstream burst. For instance, the OLT in PON applications can equalize the receive power strength ("RSSI mechanism"). Alternatively, the first activation data may be transmitted at a lower, "friendly" transmit power level that reliably increases the error rate but has a higher probability of correction. In other words, a received signal level of the upstream data may be at least 20% larger than a received signal level of the first activation data.

In some cases, the noise may overwhelm the forward error correction. In this case, the central unit may request the at least one second distributed unit to retransmit the respective upstream data that cannot be recovered. In other words, the circuitry may be configured to provide a retransmission request to the at least one second distributed unit 100 in case the upstream data being superimposed with the first activation data cannot be decoded. Accordingly, the method may comprise providing 234 a retransmission request to the at least one second distributed unit 100 in case the upstream data being superimposed with the first activation data cannot be decoded. The retransmission can be performed at two granularities. For example, retransmission can be implemented at upstream burst level, which is easier to implement, but may add more latency. Alternatively, the retransmission may be performed at FEC codeword level, which may be more complex for the at least one second distributed unit and may be implemented using sequence numbering of FEC codeword.

Figure 8A:
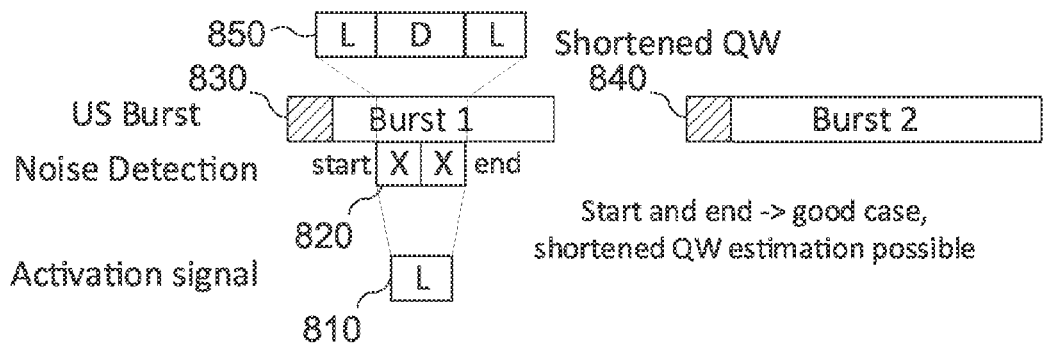
FIGS. 8*a* to 8*e* shows a relationship between an activation signal and different window phases.
Figure 8B:
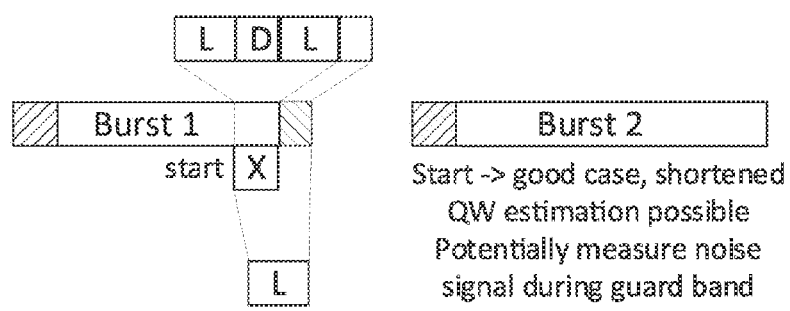
Figure 8C:
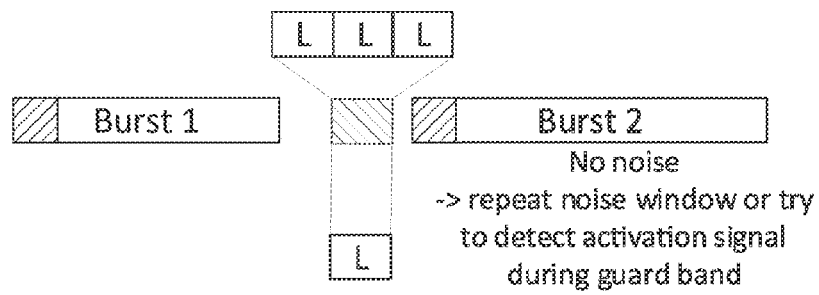
Figure 8D:
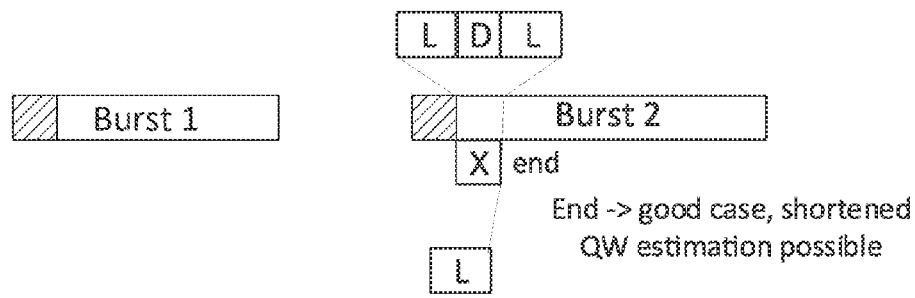

In general, there are three different scenarios regarding the superposition of the first activation data and the upstream data. These scenarios are shown, without loss of generality, for a PON in FIGS. 8*a* to 8*e*. FIGS. 8*a* to 8*e* shows some phase relations between the noise pattern and preamble/guard band/data portion. In particular, FIGS. 8*a* to 8*e* illustrate a relationship between the activation signal (i.e., the first activation data) and shortened quiet window phase relations. In case of a PON application there are three areas where the noise can be superimposed onto (and potentially corrupt) an upstream data burst. For example, the first activation data may be partially or entirely superimposed on payload data of the upstream data burst, as shown in FIGS. 8*a*, 8*b* and 8*d*. For instance, as outlined above, the increased noise level may cause an increase of the syndrome weight of codewords. In FIG. 8*a*, the first activation data is entirely superimposed on the payload data of the upstream data burst. In this case, the circuitry may be configured to determine (e.g., estimate) the reception start time and the reception end time of the first activation data based on the detected noise pattern. In FIG. 8*b*, the first activation data is partially superimposed on the payload data, with the first activation data extending into the guard band between two subsequent upstream data bursts. In this case, the circuitry may be configured to determine (e.g., estimate) the reception start time based on the detected noise pattern. Optionally, the circuitry may be further configured to detect noise within the guard band between the upstream data bursts, and to detect the reception end time based on the detected noise in the guard band. In FIG. 8*d*, the first activation data is partially superimposed on the preamble of the second upstream data burst, and partially superimposed on the payload data. In this case, the circuitry may be configured to determine (e.g., estimate) the reception end time based on the detected noise pattern. The data/payload position may always be protected with FEC, so that the increased noise level can be detected by the parity bits.

Figure 8E:
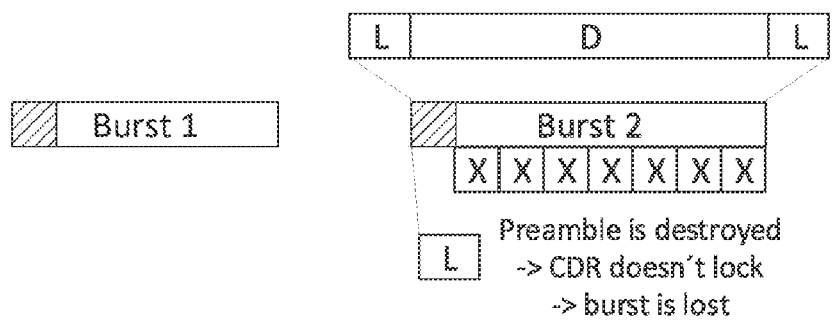

As is evident from the above description, the first activation data may be superimposed on the preamble of the upstream data burst, as shown in FIGS. 8*d* and 8*e*. To mitigate the impact of the noise, the OLT may ask the other (i.e., the at least one second) active ONUs to send a longer preamble during the noise window, so that the clock data recovery can lock even if it is hit by the noise pattern. In this case no noise is detected. In other cases, the length of the noise pattern should be approximately the normal preamble length such that the preamble can be corrupted and whole burst is lost. In this case, the corrupted burst can be re-transmitted. This scenario is shown in FIG. 8*e*. When the preamble is destroyed and the clock data recovery does not lock, the estimation of the shortened quiet window is very inaccurate. The specific implementation of signal level, pattern, and preamble length may avoid that this case occurs. However, it may be allowed to corrupt the preamble if re-transmission of the US burst is acceptable In some cases, the first activation data may be received at least partially within a guard band between subsequent upstream data bursts by the at least one second distributed unit, as shown in FIGS. 8*b* and 8*c*. Because the central unit/OLT can identify the expected start and end of a guard band, any signal during this period may indicate a noise pattern from the new ONU. Therefore, the OLT/central unit receiver may listen to the line during guard band reception.

The timing of the first activation data is used to estimate the round-trip time between the central unit and the first distributed unit. As outlined above, the term "round-trip time" might not only include the propagation time between the central unit and the first distributed unit and between the first distributed unit and the central unit, but also additional factors, such as the response time of the first distributed unit and a random delay time being set by the first distributed unit. In other words, a timing of the first activation data within the first time window may be based on the round-trip time of the first distributed unit 90 and based on a random delay time (which may be counted towards the round-trip time). This delay time may be used to avoid concurrent transmission of first activation data of different distributed units.

The circuitry is configured to determine an estimate for a round-trip time of the first distributed unit 90 based on the first activation data, e.g., based on the estimated reception start time and reception end time of the first activation data. In other words, the circuitry may be configured to determine the estimate for the round-trip time based on a reception start time and/or a reception end time of the first activation data. For example, the central unit, e.g., the circuitry, may be configured to detect the start and/or the end of noise pattern, assuming that the duration of the noise pattern is fixed and known. For example, the reception start time, which may be calculated from the reception end time if only the reception end time can be reliably determined, may be used to determine the round-trip time.

In the proposed concept, the first distributed unit attempts to time the transmission of the second activation data exactly like the transmission of the first activation data, e.g., with the same response time and the same random delay time. Therefore, the circuitry is configured to determine the length of a second time window based on the estimate for the round-trip time. In this context, the length of the second time window may comprise a start time and an end time of the second time window. In the proposed concept, the start time of the second time window may be based on the estimated roundtrip time. In other words, the circuitry may be further configured to determine a starting time of the second time window based on the estimate for the round-trip time. Accordingly, the method may further comprise determining 245 a starting time of the second time window based on the estimate for the round-trip time. The end of the second time window may be based on the length of the first activation data, which may be predefined, and the estimated roundtrip time. Additionally, safety margins may be added at either side, to account for inaccuracies of the determination of the roundtrip time. For example, if the detection of the first activation data is based on the forward error correction, which, in turn has a granularity of "codewords", the start and the end of the respective codewords being affected by the noise injection may be used as margins, with additional safety margins being added for safety.

For example, the length of the noise pattern may enable the first distributed unit to estimate the size of the shortened quiet window. This can be accomplished for instance if the length is a priori known to the central unit, and if the length of the noise pattern is equal to the duration of the first upstream message (i.e., of the second activation data) in the second part. Then the central unit can set the shortened quiet window (i.e., the second time window) size/length for instance to start of shortened quiet window=detected or derived start of distortion (first activation data)–activation signal (first activation data) length (– margin) and end of shortened quiet window=detected or derived end of distortion+activation signal length (+ margin). Therefore, the length of the second time window may be based on a length of the first activation data. In consequence, the second time window may be shorter than the first time window. For example, the length of the second time window may be at most 50% of the length of the first time window.

The circuitry is configured to grant exclusively the first distributed unit 90 to transmit second activation data to the central unit 20 during the second time window. This may be performed by transmitting another grant message (e.g., grant message of type 2, as introduced in connection with FIG. 4), to the first distributed unit. For example, the circuitry may be configured to exclusively grant, during the second time window, the first distributed unit 90 to transmit the second activation data to the central unit 20 by transmitting a second grant message over the TDM P2MP network. For example, the second grant message may comprise data indicating the second time window and the exclusive grant to transmit the second activation data to the central unit 20. In other words, the second grant message may indicate that a second time window, i.e., a shortened quiet window, is being opened, and that a previously unregistered distributed unit having transmitted the first activation data is granted permission to transmit during the second time window (i.e., with the same delay that was used for transmitting the first activation data). In other words, the second grant message may indicate that the first distributed unit is to use the same delay for transmitting the second activation data that was used for transmitting the first activation data.

Figure 5:
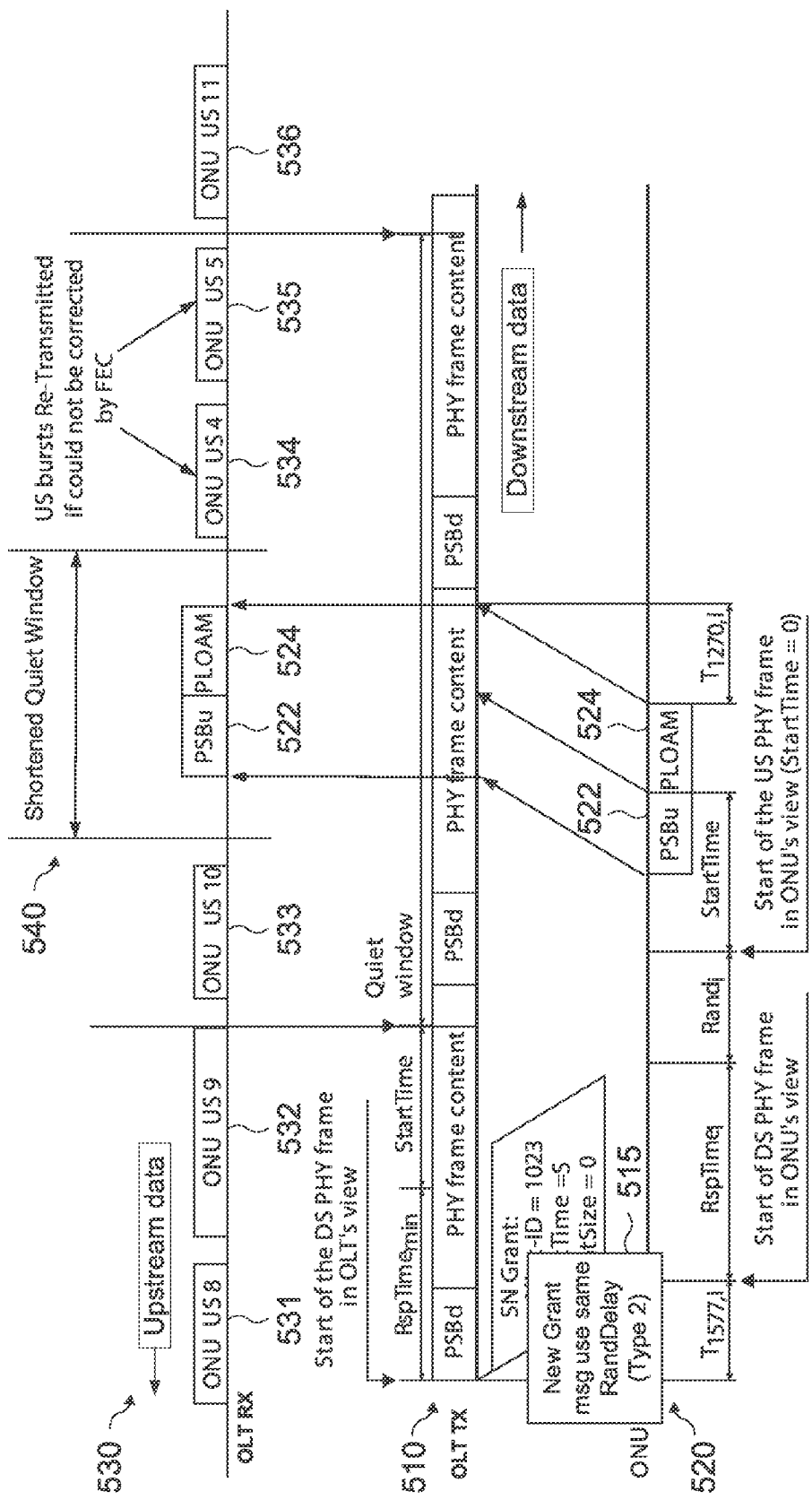
FIG. 5 shows a schematic diagram of a second part of the activation procedure with a shortened quiet window.

The second time window is granted exclusively for the first distributed unit. However, the second time window may be part of an upstream frame, which may be used by other distributed units, such as the at least one second distributed unit. For example, the second grant message is part of, or provided with, a transmission map (e.g., a BW map) for an (upstream) transmission frame. The second time window may be contained in a time interval allocated for transmitting the (upstream) transmission frame. In other words, the second activation data is to be transmitted as part of the (upstream) transmission frame, for example. As shown in FIG. 5, the transmission map may assign time outside the second time window and inside the time interval to one or more further distributed units to transmit upstream data.

The circuitry is configured to register the first distributed unit 90 to the TDM P2MP network based on the second activation data. For example, the second activation data may comprise information on a serial number or other identifier of the first distributed unit. For example, as further shown in FIG. 5 with respect to a PON, the second activation data may comprise a PLOAM (Physical Layer Operations, Administrations and Maintenance) message comprising information on the serial number of the first distributed unit. The circuitry may be configured to register the first distributed unit with the TDM P2MP using the serial number of the first distributed unit. Additionally, the registration may be confirmed to the first distributed unit. For example, the circuitry may be configured to register the first distributed unit 90 to the TDM P2MP network by sending a third (grant) message over division multiplexed point-to-multipoint network. The third message comprises data indicating registration information for the first distributed unit 90 in the TDM P2MP network.

In various examples, the circuitry may be configured to perform ranging to determine the propagation time between the first distributed unit and the central unit. For example, the circuitry may be configured to use the second activation data for ranging. In this case, the second activation data may comprise information on the random delay time being used by the first distributed unit. Alternatively, the ranging procedure may be performed after transmitting the third message.

In the following, some corner cases, and their resolution are illustrated.

In some cases, the disturbance (i.e., the noise injection) may be missed during noise window, e.g., because the special activation signal (i.e., the first activation data) is too weak. This may be mitigated by limiting the maximal delta (i.e., difference) between the strongest and weakest receive signal, by RSSI (Received Signal Strength Indication) measurement for RX (receive) signal strength equalization. The procedure may be repeated, a new noise window may be opened, and the level of the noise pattern may be increased.

In some cases, collisions may occur if more than one distributed unit attempts to access the noise window. This may be detected by detecting whether the detected noise pattern is longer than one noise pattern length. This may be mitigated by repeating the activation sequence. By using a random delay time Randi, each distributed unit/ONU may use an individual Randi and the distortion are likely to be separated.

In some cases, many or all DU may attempt to access the P2MP medium. This situation occurs typically after a power cycle or complete shut-down of the P2MP medium. Since in these cases most distributed units are not active, a normal activation with a legacy quiet window can be done.

In some cases, it may be necessary to distinguish the "noise pattern" from transmission of a rogue distributed unit. In case a noise pattern is received, the increased error level of the noise pattern is strictly limited to the noise window. If an increased error level or unexpected signal level is detected outside a noise window, then it may be deemed to be caused by a rogue DU and the usual mitigation measures can be invoked.

In general, a mixed mode may be implemented, where, in some cases, a legacy grant message, as shown in FIG. 3, is transmitted, and in some other cases, the proposed concept is used. In case there is no upstream burst grants pending, the central unit can avoid opening the noise window and directly proceed with a long quiet window as shown in FIG. 3 with Type 0 message.

The interface circuitry/means for communicating 22 may correspond to one or more inputs and/or outputs for receiving and/or transmitting information, which may be in digital (bit) values according to a specified code, within a module, between modules or between modules of different entities. For example, the interface circuitry/means for communicating 22 may comprise interface circuitry configured to receive and/or transmit information.

In various examples, the processing circuitry/means for processing 24 may be implemented using one or more processing units, one or more processing devices, any means for processing, such as a processor, a computer or a programmable hardware component being operable with accordingly adapted software. In other words, the described function of the processing circuitry/means for processing 24 may as well be implemented in software, which is then executed on one or more programmable hardware components. Such hardware components may comprise a general-purpose processor, a Digital Signal Processor (DSP), a microcontroller, etc.

In various examples, the memory/storage circuitry/means for storing and retrieving information 26 may comprise at least one element of the group of a computer readable storage medium, such as a magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the central unit, the corresponding method and computer program, the OLT, and also the first and second distributed units and ONUs are mentioned in connection with the proposed concept or one or more examples described above or below (e.g. FIGS. 1, 3 to 9b). The central unit, the corresponding method and computer program, the OLT, and the first and second distributed units and ONUs may comprise one or more additional optional features corresponding to one or more aspects of the proposed concept or one or more examples described above or below.

In the following, the proposed concept is illustrated, without loss of generality, with reference to passive optical networks (PON), where the central unit may be an Optical Line Terminal (OLT) and the distributed units may be Optical Networking Units (ONUs). The proposed concept may be applied to other types of TDM P2MP networks as well, such as coaxial cable-based TDM P2MP systems.

FIG. 3 shows a schematic diagram of timing relationships during serial number acquisition that is based on a long quiet window. In FIG. 3, and similarly in FIGS. 4 and 5, three timelines are shown—a first timeline 310 that shows the transmissions of an OLT (i.e., a central unit), a second timeline 320 that shows the transmissions received by an ONU (i.e., a distributed unit), and a third timeline 330 that shows the transmissions receive by the OLT. The OLT transmits a frame with a sequence of physical synchronization block downstream (PSBd) blocks, followed by physical layer (PHY) frame content. The frame comprises a serial number (SN) grant message 315 (of Type 0, i.e. as used in conventional PON) that is received by the ONU after a delay ($T_{1577,1}$). The receipt of the frame defines the start of the downstream (DS) PHY frame in the ONU's view. After a response time $RspTime_i$ and a random time interval Randi, the upstream (US) PHY frame starts in the ONU's view, and the ONU transmits a physical synchronization block upstream (PSBu) 322 and a PLOAM (Physical Layer Operations, Administrations and Maintenance) message 324 comprising the serial number of the ONU to the OLT. The OLT receives the PSBu 322 and the PLOAM message 324 within the quiet window 336 (having a duration of 250 to 450 µs). The quiet window is delimited by the time of the earliest expected serial number PLOAM message and by the latest expected serial number PLOAM message. Before and after the quiet window, the OLT receives upstream data ONU US 1 3 332, ONU US 2 334, and ONU US 338 from other ONUs.

The proposed concept is based on the finding, that the activation of a new distributed unit on the P2MP medium can be split into two parts, which may reduce the need for a long quiet window. During a so-called noise window, in which, in contrast to the quiet window, other distributed units are granted to transmit upstream data, the distributed unit to be activated transmits first activation data, which may be a noise pattern, for example. This first activation data is superimposed over the upstream data of the other (second) distributed unit(s), and is detected as noise by the central unit. If such noise is detected, in a subsequent upstream frame, a shorter quiet window is opened, during which the distributed unit to be activated (i.e., the first distributed unit) can transmit its activation message (i.e., the second activation data, which may be a PLOAM message with the distributed unit's serial number). Additional measures may be taken to mitigate the impact (of the first activation data) on payload data of other, active distributed units.

The proposed activation concept comprises a first activation part with a "noise window" (i.e., the first time window) for coarse measurement of the round-trip delay of the new station, and a second activation part with a "shortened quiet window" (i.e., the second time window) based on initial course round-trip delay, for actual initialization & registration of the distributed unit to be activated on the P2MP medium (e.g. refined measurement of transmission delay for calculation of equalization delay, serial number acquisition). During the noise window, mitigation of the noise impact may be performed, e.g. using retransmission, or increased FEC protection The proposed concept enables activation of a new station on a P2MP medium while the latency penalty for other stations can be reduced. Further, the proposed concept may render implementation with low complexity possible, as the measures, as outlined above, are based on technologies implemented in existing frameworks.

Figure 4:
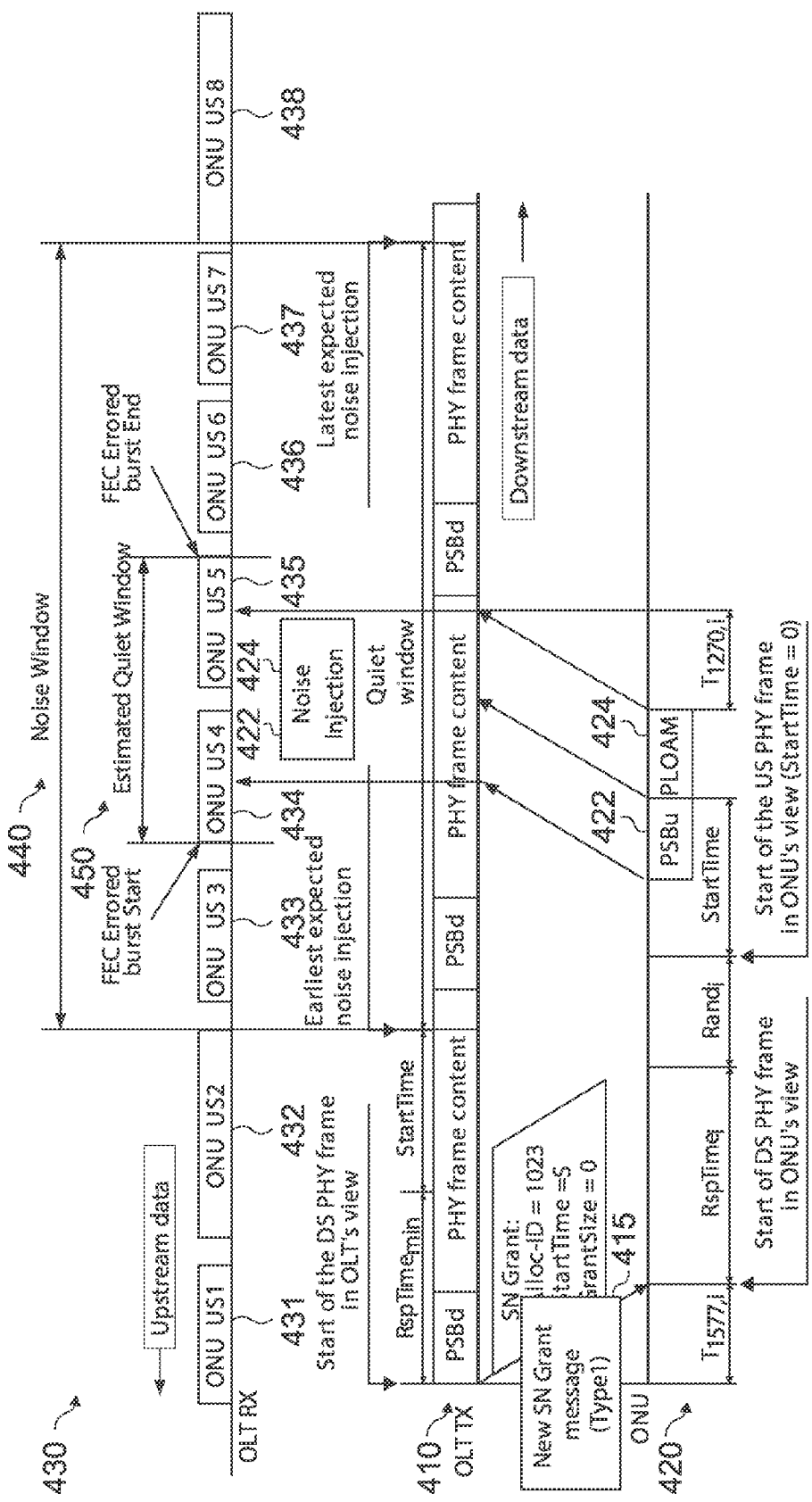
FIG. 4 shows a schematic diagram of a first part of the activation procedure with a noise window.

In the following, the first distributed unit activation part with the noise window is introduced in more detail, as shown in FIG. 4. In the first activation part the central unit opens a "noise window" that allows a new distributed unit to transmit a special first activation signal in upstream on the P2MP medium ("noise pattern"). The noise pattern does not need to carry payload data but may use special patterns as described in connection with FIGS. 2a to 2c. FIG. 4 shows a schematic diagram of the first part of the activation procedure with a noise window.

Similar to FIG. 3, three timelines are shown-a first timeline 410 showing the transmissions of the OLT (OLT TX), a second timeline 420 showing the transmissions received and transmitted by the ONU to be added, and a third timeline 430 showing the transmissions received by the OLT (OLT RX). Similar to FIG. 3, the OLT transmits a SN grant message 415 to the ONU, which is received after a (propagation-based) delay. In contrast to FIG. 3, another type of grant message is transmitted (Type 1, e.g., the first grant message), which instructs the ONU to transmit the first activation data, e.g., the noise pattern, during the "noise window" 440. For instance, in a PON application an ONU in this state receives a Serial Number Grant Message. With two-part activation it is labelled "Type 1" to differentiate it from the Serial Number Grant Message in the second part (labelled "Type 2"). For example, the noise window may have the same length (i.e., the same start and end time) as the quiet window of FIG. 3, and which may be delimited by the time of the earliest and latest expected noise injection (which may be based on the maximal and minimal propagation time and based on the maximal and minimal random delay Randi). In FIG. 4, for backward compatibility, the ONU sends a PSBu 422 and PLOAM message 424. However, instead of the PSBu and PLOAM, a noise pattern may be transmitted.

During this noise window the other active distributed units are also granted transmission opportunities so that latency sensitive services are not impacted. The noise pattern from the new distributed unit injects noise into the upstream (data) transmission bursts of the other distributed units. The transmitted data injects noise into two upstream transmissions 434; 435 of other (second) ONUs. Other upstream transmissions 431; 432; 433; 436; 437; 438, which are permitted to occur during the noise window 440, are not disturbed by the noise injection. The central unit detects the start and/or end of the distortion from the injected noise and estimates the round-trip time of the new DU. This coarse estimation of the round-trip delay is used to open a "shortened" quiet window in the second activation part (see FIG. 5 for details; FIG. 4 illustrates the first distributed unit activation part with noise window). Based on the upstream data 434; 435 being superimposed with the noise injection, which may manifest itself as bursts with FEC errors, a length (i.e., start and end) of a quiet window 450 may be estimated, which may be used in part two of the activation procedure, as shown in FIG. 5. For illustrative purposes, the length of the quiet window, as used in FIG. 3, is also shown in FIG. 4. In FIG. 4, the length of the noise window corresponds to the length of the quiet window, as used in FIG. 3. However, in some examples, the length, e.g., start and end relative to the frame, of the noise window may be different from the length of the quiet window used in FIG. 3.

In the following, the second distributed unit activation part with the shortened quiet window is shown. In the second activation part, the central unit opens a shortened quiet window. The duration and the point in time of the shortened quiet window are based on the detection of the noise pattern in the first activation part. Therefore, the duration of the shortened quiet window can be significantly reduced compared to the legacy quiet window that is based on the maximum allowed spread of distributed unit distances along the P2MP medium. The second distributed unit activation part is used for actual initialization & registration of the distributed unit on the P2MP medium.

Figure 7:
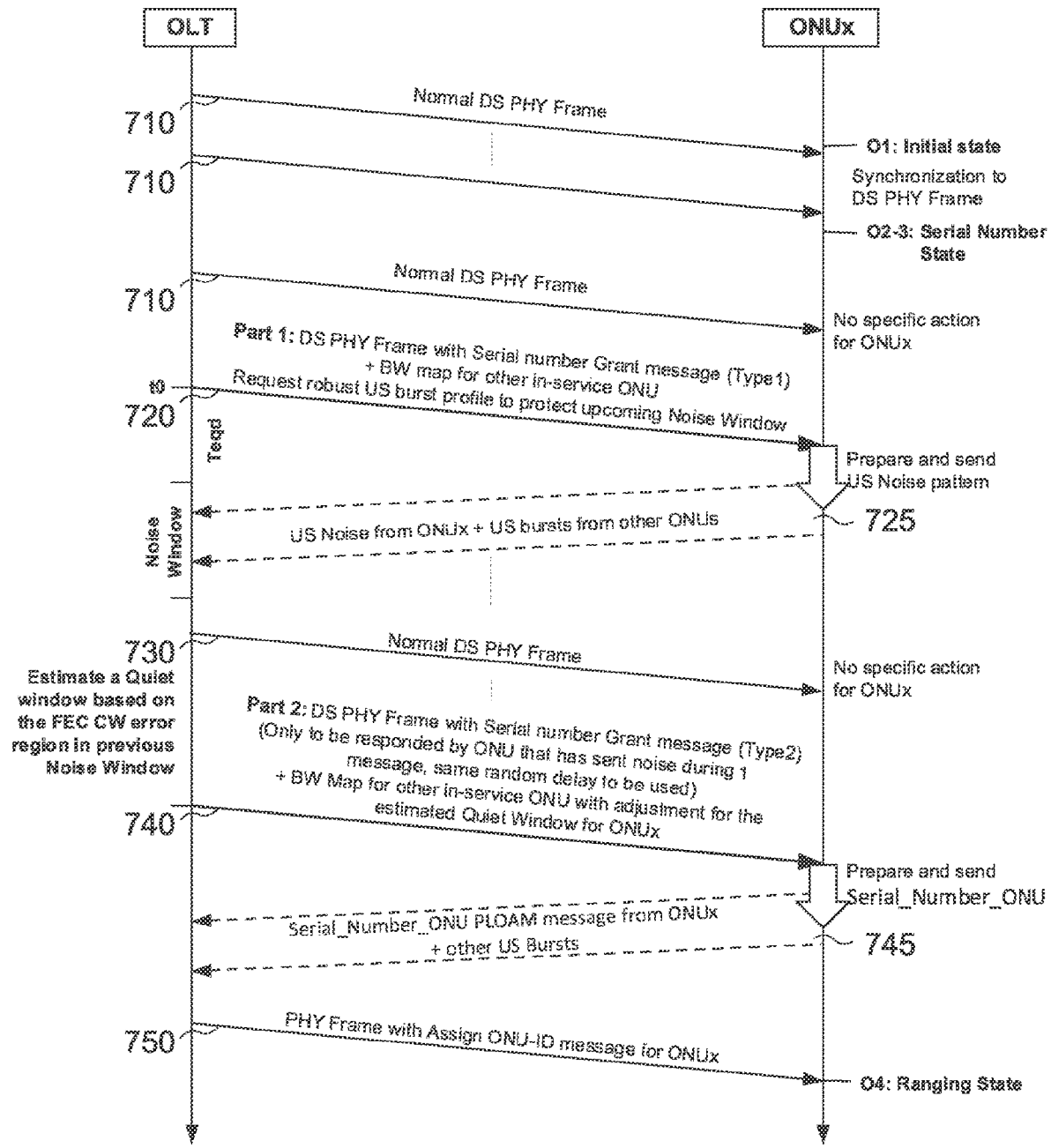
FIG. 7 shows a flow chart of a concept for serial number acquisition that is based on the proposed two-step activation with a noise window.

FIG. 5 shows a schematic diagram of the second part of the activation procedure with a shortened quiet window. Similar to FIGS. 3 and 4, three timelines are shown—a first timeline 510 showing the transmissions of the OLT (OLT TX), a second timeline 520 showing the transmissions received and transmitted by the ONU to be added, and a third timeline 530 showing the transmissions received by the OLT. Similar to FIGS. 3 and 4, the OLT transmits a SN grant message 515 to the ONU, which is received after a (propagation-based) delay. In contrast to FIGS. 3 and 4, another type of grant message is transmitted (Type 2, e.g., the second grant message), which instructs the ONU to transmit the second activation data, e.g., the serial number or other identifier of the ONU. For instance, in a PON application an ONU in this state receives a Serial Number Grant Message of Type 2, and it transmits a serial number response in the form of a Serial Number ONU PLOAM 524 message (following a PSBu 522). The distributed unit thus responds to the grant message with a normal upstream message. In various examples, the distributed unit may be required to transmit this upstream message 522; 524 with a delay (RspTime; and Randi) that is exactly equal to the first activation part, so that the upstream burst is received at the central unit within the shortened quiet window 540. In a PON application, this applies in particular to the Randi value. Before and after the shortened quiet window, the other (second) ONUs may transmit upstream data ONU US 8-11 531-536. For illustrative purposes, the length of the quiet window, as used in FIG. 3, is also shown in FIG. 5, which is substantially longer (more than twice as long) than the shortened quiet window 540. After (or before) the shortened quiet window, upstream bursts transmitted during the noise window 440 (shown in FIG. 4) may be retransmitted if the upstream data could not be corrected using FEC. The OLT can perform a refined measurement of the round-trip delay for precise calculation of the distributed unit's equalization delay later in the Ranging state (see FIG. 7 for further details; FIG. 7 illustrates the second distributed unit activation part with shortened quiet window), based on response 522; 524 of the ONU.

In the following, various examples of concepts for a mitigation of an impact of the noise window on other, active (second) distributed units are shown. Active distributed units (i.e., the at least one second distributed unit) are exposed to higher noise levels during the noise window. In order to avoid loss of data, the other, active ONUs may take measures to increase the error correction capabilities during the noise window.

For instance, in a PON application, the OLT can send a new burst profile PLOAM message to the other ONUs before opening a noise window. This new burst profile message can carry a new flag for increased error protection, e.g.: Upstream FEC indication: 0000 00FF, where FF=11: FEC increased (new, used during noise window), FF=01: FEC on (legacy) and FF=00: FEC off (legacy).

A collection of potential measures to increase the error correction capabilities, e.g. retransmission or increased FEC protection, is introduced in connection with FIGS. 2a to 2c.

More details and aspects of the proposed concept are mentioned in connection with the proposed concept or one or more examples described above or below (e.g. FIGS. 1 to 3b, 6 to 9b). The proposed concept may comprise one or more additional optional features corresponding to one or more aspects of the proposed concept or one or more examples described above or below.

Figure 6:
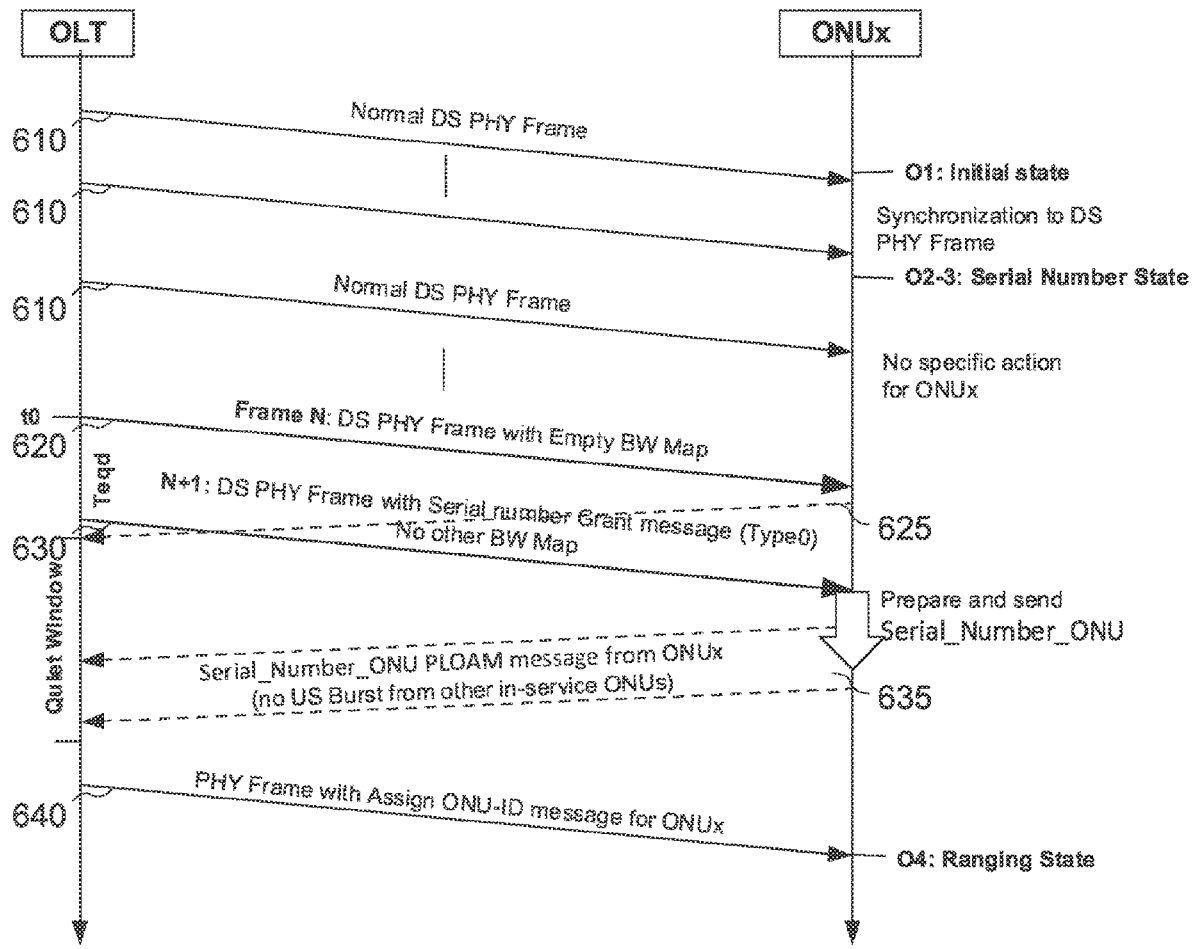
FIG. 6 shows a flow chart of a concept for serial number acquisition that is based on a long quiet window.

In the following, two flow charts are shown-a first flow chart shown in FIG. 6, which outlines the activation procedure with a long quiet window, and a second flow chart shown in FIG. 7, which outlines the activation with a noise window and a shortened quiet window according to the proposed concept. The flow charts in FIG. 6 and FIG. 7 are exemplary for a PON application. FIG. 6 shows the legacy flow according to G.987.3, and FIG. 7 shows a flow chart of an example of the proposed two-part activation with noise window.

FIG. 6 shows a flow chart of a concept for serial number acquisition that is based on a long quiet window. When a new ONU (ONUx on the right) is initiated, it starts at an initial state O1. The ONUx uses "normal" downstream (DS) PHY frames 610 (i.e., without a serial number grant message) transmitted by the OLT (on the left) to synchronize itself to the downstream frames, and transitions into a "serial number state" O2-3, in which it waits to transmit a PLOAM with its serial number to the OLT. At to, the OLT transmits, in frame N, a DS PHY frame 620 with an empty BW (bandwidth) map, which triggers 625 the beginning of the quiet window, as perceived by ONUs, based on a round-trip time between the OLT and ONUx. In the subsequent frame N+1, the OLT transmits a DS PHY frame 630 with a serial number grant message (type 0), as shown in FIG. 3, and without another BW map. In response to the grant message, the ONUx prepares and sends a PLOAM 635 with a serial number of the ONU. During the quiet window, no other upstream bursts from other (second) in-service ONUs are granted. After receiving the PLOAM message 635, the OLT transmits a PHY frame 640 with an assign ONU-ID message for ONUx. Upon receipt of the assign ONU-ID message, the ONUx transitions to the ranging state O4.

FIG. 7 shows a flow chart of a concept for serial number acquisition that is based on the proposed two-step activation with a noise window. Similar to the concept shown in FIG. 6, initially, when a new ONU (ONUx on the right) is initiated, it starts at an initial state O1. The ONUx uses "normal" downstream (DS) PHY frames 710 (i.e., without a serial number grant message) transmitted by the OLT (on the left) to synchronize itself to the downstream frames, and transitions into a "serial number state" O2-3, in which it waits to transmit a PLOAM with its serial number to the OLT. At to, the OLT initiates the first part of the two-part activation, by transmitting a DS PHY frame 720 with a serial number grant message of type 1 (i.e., the first grant message), as illustrated in FIG. 4, and a BW map for the other (second) in-service ONUs, granting them to transmit upstream data during the noise window. The OLT may request a robust upstream burst profile to protect the upstream transmission during the upcoming noise window. Based on the transmission of the PHY DS frame 720, the noise window is opened (based on an earliest and latest expected noise injection, which is based on the minimal and maximal round-trip time, the response time and the random delay). The ONUx prepares and sends an upstream noise pattern 725 (i.e., the first activation data), which is received by the OLT during the noise window. Additionally, the OLT may receive other upstream bursts during the noise window. Subsequently, the OLT transmit a "normal" DS PHY frame 730 (without a serial number grant message), and estimates the shortened quiet window based on the FEC codeword error region in the previous noise window. Then, the OLT initiates the second part of the two-part activation, and transmits a DS PHY frame 740 with a serial number grant message of type 2 (i.e., the second grant message) to the ONUx. This message might only be responded by the ONUx that has sent noise during the noise window in response to the first grant message, with the same random delay to be used. The DS PHY frame 740 also includes a BW map for other (second) in-service ONUs with adjustment to the estimated quiet window that is reserved exclusively for ONUx. In response to the grant message of type 2, the ONUx prepares and sends a PLOAM message 745 with the serial number of ONUx. Additionally, outside the shortened quiet window, the other ONUs transmit their US bursts. The OLT responds to the PLOAM message with the serial number of ONUx with an PHY DS frame 750 with an assign ONU-ID message for ONUx. Upon receipt of the assign ONU-ID message, ONUx transitions to the ranging state O4.

More details and aspects of the proposed concept are mentioned in connection with the proposed concept or one or more examples described above or below (e.g. FIGS. 1 to 5, 8a to 9b). The proposed concept may comprise one or more additional optional features corresponding to one or more aspects of the proposed concept or one or more examples described above or below.

In general, the noise injected by the first distributed unit may collide with the upstream data bursts of the at least one second distributed unit at different points in time. In FIGS. 8a to 8e, different scenarios regarding the collusion between the injected noise and the upstream data bursts are shown. FIGS. 8a to 8e shows a relationship between an activation signal and different quiet/noise window phases. FIGS. 8a to 8e show an activation signal 810 (i.e., the first activation data) that is transmitted by the distributed unit. The activation signal is superimposed over zero or more codewords 820 of an upstream data burst 830; 840 of the at least one second distributed unit, with the noise caused by the activation signal being detected using noise detection. The upstream data bursts comprise a preamble at the beginning of the upstream data bursts and payload data subsequent to the preamble. Based on the codewords affected by the noise injection, a shortened quiet window 850 is calculated, which may comprise the length of the activation signal 850, plus margins that are based on the duration of the codewords 820 affected by the activation signal (and optional additional safety margins at both ends of the shortened quiet window.

In FIG. 8*a*, the activation signal is superimposed over two codewords of a first upstream data burst, so that a start and an end of the activation signal can be determined. This is a good case, as the estimation of the shortened quiet window is possible.

In FIG. 8*b*, the activation signal is superimposed over the last codeword of the first upstream data burst, with the activation signal extending into a guard band between the upstream data bursts. This is also a good case, as the start of the activation signal can be determined and the length (i.e., its start time and end time) of the activation signal can be calculated based on its start. Thus, the shortened quiet window can be estimated. Optionally, the central unit may also measure the noise signal during the guard band, which may further improve the determination of the shortened quiet window.

In FIG. 8*c*, the activation signal is received between the two upstream data bursts. In this case, the noise window may be repeated, or the central unit may try to detect the activation signal during the guard band between the two upstream data bursts.

In FIG. 8*d*, the activation signal is superimposed over the preamble and the first codeword of the second upstream data burst. This is also a good case, as the end of the activation signal can be determined and the length (i.e., its start time and end time) of the activation signal can be calculated based on its end.

In FIG. 8*e*, the activation signal is superimposed over the preamble and the first codeword of the second upstream data burst. However, in this case, the noise-free portion of the preamble is insufficient for clock data recovery, so the entire burst is lost, and a shortened quiet window cannot be estimated.

More details and aspects of the proposed concept are mentioned in connection with the proposed concept or one or more examples described above or below (e.g. FIGS. 1 to 7, 9*a* to 9*b*). The proposed concept may comprise one or more additional optional features corresponding to one or more aspects of the proposed concept or one or more examples described above or below.

In the following, the proposed concept is illustrated with respect to the individual distributed units. The distributed unit 90 introduced in connection with FIGS. 9*a* and 9*b* may correspond to the first distributed unit 90 introduced in connection with the previous figures. However, each distributed unit, and thus also the at least one second distributed unit, may be equipped to form the proposed activation concept. Therefore, the at least one second distributed unit may be implemented similar to the distributed unit 90 introduced in the following.

Figure 9A:
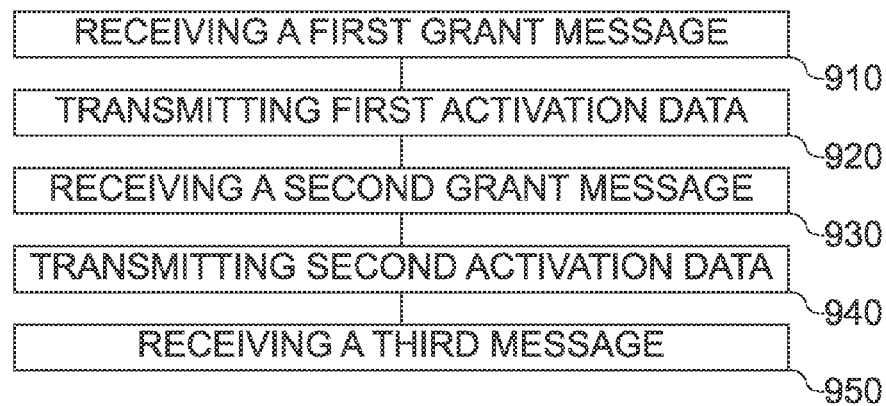
FIG. 9*a* shows a flow chart of an example of a method for a distributed unit.

FIG. 9*a* shows a flow chart of an example of a method for a distributed unit of a TDM P2MP network. The method comprises receiving 910 a first grant message over the TDM P2MP network from a central unit 20 of the TDM P2MP network. The first grant message comprises data indicating a first time window during which the distributed unit is granted to transmit first activation data for registering at the TDM P2MP network to the central unit 20 concurrently to upstream data of at least one second distributed unit 100 already registered to the TDM P2MP network. The method comprises transmitting 920 the first activation data during the first time window. The method comprises receiving 930 a second grant message over the TDM P2MP network from the central unit 20. The second grant message comprises data indicating a second time window during which distributed unit is exclusively granted to transmit second activation data for registering at the TDM P2MP network to the central unit 20. The method comprises transmitting 940 the second activation data during the second time window. The method comprises receiving 950 a third message comprising data indicating registration information for the distributed unit in the TDM P2MP network. For example, the method may be performed by the distributed unit 90.

Figure 9B:
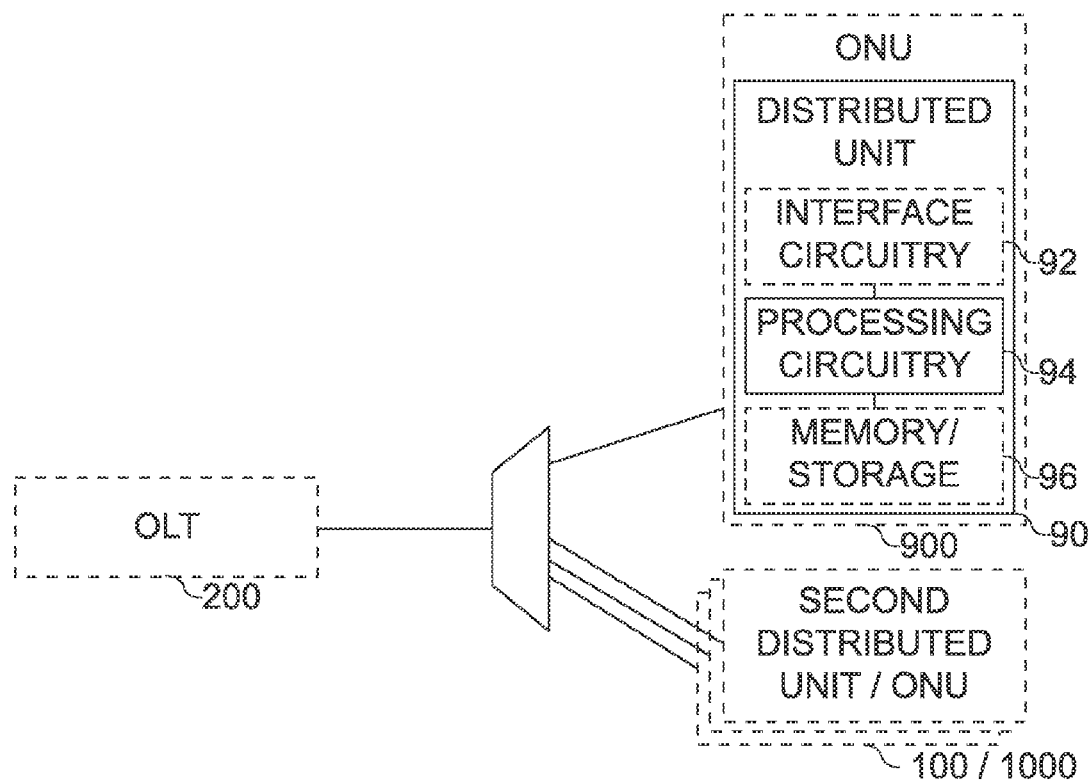
FIG. 9*b* shows a block diagram of a distributed unit; an optical networking unit comprising a distributed unit, and a system comprising an optical line terminal and one or more optical networking units.

FIG. 9*b* shows a block diagram of a distributed unit 90, an optical networking unit 900 comprising the distributed unit 90, and a system comprising an optical line terminal 200 and one or more optical networking units 900. The distributed unit 90 comprises circuitry or means, configured to provide the functionality of the distributed unit. For example, the circuitry or means may be configured to perform the method of FIG. 9*a* and/or 9*b*. For example, the distributed unit may comprise processing circuitry 94 or, more generally, means for processing 94, which may be configured to perform the functionality of the distributed unit. Additionally, the preamble distributed unit may comprise interface circuitry 92 and memory/storage circuitry 96, or, more generally, means for communicating 92 and means for storing information 96, and which may be used for transmitting and receiving information, and for storing and retrieving information, respectively. In the following, if the distributed unit is configured to perform an action, the respective action may be performed by the respective circuitry of means of the distributed unit, or by the corresponding method or computer program.

The circuitry/means (e.g., the processing circuitry/means for processing) is configured to receive the first grant message over the TDM P2MP network from the central unit 20 of the TDM P2MP network (e.g., via the interface circuitry/means for communicating). The circuitry/means (e.g., the processing circuitry/means for processing) is configured to transmit the first activation data during the first time window (e.g., via the interface circuitry/means for communicating). The circuitry/means (e.g., the processing circuitry/means for processing) is configured to receive the second grant message over the TDM P2MP network from the central unit 20 (e.g., via the interface circuitry/means for communicating). The circuitry/means (e.g., the processing circuitry/means for processing) is configured to transmit the second activation data during the second time window (e.g., via the interface circuitry/means for communicating). The circuitry/means (e.g., the processing circuitry/means for processing) is configured to receive the third message comprising data indicating registration information for the distributed unit in the TDM P2MP network (e.g., via the interface circuitry/means for communicating).

In various illustrative examples of the present disclosure, the TDM P2MP network may be a Passive Optical Network (PON). Accordingly, the distributed unit may be, or may be included in, an ONU of the PON. FIG. 9*b* thus further shows an ONU 900 comprising or corresponding to the distributed unit 90. FIG. 9*b* further shows a PON system comprising an OLT 200 (with the central unit 20), an ONU 900 comprising the distributed unit 90, and one or more ONUs 1000 comprising the at least one second distributed unit 100. However, the proposed concept is not limited to PON.

Alternatively, the proposed concept may be applied to other TDM P2MP networks, such as coaxial cable-based TDM P2MP networks.

For the sake of simplicity, the concept is illustrated with respect to the circuitry of the distributed unit. Features introduced in connection with the circuitry of the central unit may likewise be applied to the corresponding means, method and computer program.

Various examples of the present disclosure relate to a distributed unit, and to a corresponding method and computer program for the central unit. This distributed unit is the counterpart to the central unit introduced in connection with FIGS. 2a to 8e. Accordingly, the distributed unit is not yet registered to the TDM P2MP network. It receives the first grant message, which requests the distributed unit to transmit the first activation during the first time window. At the same time, as outlined in connection with the previous figures, other distributed units are granted permission to transmit upstream data during the first time window. The first activation data may inject noise onto the common channel being used to transmit the upstream data, which may be detected by the central unit. Therefore, the first time window may be a noise window.

The distributed unit receives a first grant message with data indicating the first time window during which the distributed unit is granted to transmit first activation data for registering at the TDM P2MP network. As outlined in connection with FIGS. 2a to 2c, the data indicating the first time window may indicate, that the first time window is opened. In some examples, the data indicating the first time window may further indicate a timing (e.g., a start and an end) of the first time window relative to an upstream frame to be transmitted in response to the grant, or relative to the receipt of the downstream frame comprising the first grant message. In other words, the distributed unit is informed, by the central unit, that the first time window is being opened, and that (any) previously unregistered distributed unit are granted permission to transmit within the first time window. In response to the grant, the distributed unit transmits the first activation data.

The first activation data is transmitted in the same time window that is also being used by the at least one second distributed unit to transmit the upstream data. In addition, the same channel is being used for the first activation data and for the upstream data. In other words, the circuitry may be configured to transmit the first activation data via the same channel of the TDM P2MP network as used by the at least one second distributed unit 100 for transmitting the upstream data to the central unit 20. Consequently, as illustrated in connection with FIGS. 2a to 8e, the first activation data may be superimposed over the upstream data.

In general, any kind of data or pattern may be used as first activation data. In particular, however, a predetermined data pattern, such as a noise pattern may be used. For example, the predetermined data pattern a preamble pattern (i.e., the same pattern that is used for the preamble of the upstream data) and an alternating pattern (i.e., a pattern alternating between ones and zeros in a regular and repetitive pattern).

In some examples, the first activation data may be transmitted with a high signal level, to make sure that the noise is being detected by the central unit. In other words, the circuitry may be configured to transmit the first activation data with a signal level equal to that used for transmitting upstream data (i.e., user data) to the central unit 20. For example, the circuitry may be configured to transmit the first activation data with a signal level that is at most 20% higher or lower than that used for transmitting upstream data to the central unit 20. Alternatively, a lower signal level may be used, to improve the chances of successful error recovery, and thus reduce the probability of a retransmission being required. In other words, the circuitry may be configured to transmit the first activation data with a signal level that is at least 20% lower than that used for transmitting upstream data to the central unit 20.

After transmission of the first activation data, and successful detection thereof by the central unit, the distributed unit receives the second grant message from the central unit. The second grant message comprises data indicating the second time window during which the distributed unit is exclusively granted to transmit second activation data for registering at the TDM P2MP network to the central unit 20. This second time window is based on the timing of the transmission of the first activation data. In particular, the second time window may be based on the round-trip time of the distributed unit vis-à-vis the central unit, as estimated based on the transmitted first activation data. The transmission of the first activation data, on the other hand, may be based on a random delay time. In other words, the circuitry may be configured to transmit the first activation data within the first time window after a random delay time. To transmit the second activation data during the second time window, the distributed unit may use the same delay that was used to transmit the first activation data. In other words, the circuitry may be configured to transmit the first activation data after a first delay time since the reception of the first grant message lapses (i.e., after the time of reception of the first grant message), and to transmit the second activation data after a second delay time since the reception of the second grant message lapses. The first delay time may be equal to the second delay time. Accordingly, the second may indicate that a second time window, i.e., a shortened quiet window, is being opened, and that the distributed unit is granted the right to transmit during the second time window. Additionally, the second grant message may indicate that the first distributed unit is to use the same delay for transmitting the second activation data that was used for transmitting the first activation data.

To successfully transmit the second activation data within the second time window, the distributed unit may determine the timing of the second time window. As outlined above, the timing of the second time window may be based on the timing of the transmission of the first activation data. In particular, a length of the first activation data may be predefined, and equal to a length of the second activation data. The second time window may be fit around the estimated transmission timing of the second activation data, as shown in connection with FIGS. 2a to 8e. Accordingly, a length of the second time window may be based on a length of the first activation data.

The second activation data is used to register the distributed unit with the central unit, and therefore with the TDM P2MP network. To register the distributed unit, the central unit may require the serial number (or another identifier) of the distributed unit. Accordingly, the second activation data indicate a serial number of the distributed unit. After transmitting the second activation data, the distributed unit receives a third message comprising data indicating registration information for the distributed unit in the TDM P2MP network. For example, in a PON, the registration information may comprise information on an ONU-ID of the distributed unit.

After registration (or even before the registration is completed), ranging may be performed between the central unit and the distributed unit. In other words, the central unit may be configured to perform a ranging procedure with the central unit.

The interface circuitry/means for communicating 92 may correspond to one or more inputs and/or outputs for receiving and/or transmitting information, which may be in digital (bit) values according to a specified code, within a module, between modules or between modules of different entities. For example, the interface circuitry/means for communicating 92 may comprise interface circuitry configured to receive and/or transmit information.

In various examples, the processing circuitry/means for processing 94 may be implemented using one or more processing units, one or more processing devices, any means for processing, such as a processor, a computer or a programmable hardware component being operable with accordingly adapted software. In other words, the described function of the processing circuitry/means for processing 94 may as well be implemented in software, which is then executed on one or more programmable hardware components. Such hardware components may comprise a general-purpose processor, a Digital Signal Processor (DSP), a microcontroller, etc.

In various examples, the memory/storage circuitry/means for storing and retrieving information 96 may comprise at least one element of the group of a computer readable storage medium, such as a magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the distributed unit, the central unit, the ONU, the OLT, the PON, and the corresponding method and computer program are mentioned in connection with the proposed concept or one or more examples described above or below (e.g. FIGS. 1 to 8e). The distributed unit, the central unit, the ONU, the OLT, the PON, and the corresponding method and computer program may comprise one or more additional optional features corresponding to one or more aspects of the proposed concept or one or more examples described above or below.

The aspects and features described in relation to a particular one of the previous examples may also be combined with one or more of the further examples to replace an identical or similar feature of that further example or to additionally introduce the features into the further example.

An example (e.g., example 1) relates to a central unit (20) for a time-division multiplexed (TDM) point-to-multipoint (P2MP) network, the central unit (20) comprising circuitry configured to grant, during a first time window, a first distributed unit (90) not yet registered to the TDM P2MP network to transmit first activation data to the central unit (20). The central unit (20), e.g., the circuitry, is configured to grant, during the first time window, at least one second distributed unit (100) already registered to the TDM P2MP to transmit upstream data to the central unit (20). The central unit (20), e.g., the circuitry, is configured to receive the first activation data during the first time window. The central unit (20), e.g., the circuitry, is configured to determine an estimate for a round-trip time of the first distributed unit (90) based on the first activation data and a length of a second time window based on the estimate for the round-trip time. The central unit (20), e.g., the circuitry, is configured to grant exclusively the first distributed unit (90) to transmit second activation data to the central unit (20) during the second time window. The central unit (20), e.g., the circuitry, is configured to register the first distributed unit (90) to the TDM P2MP network based on the second activation data.

Another example (e.g., example 2) relates to a previously described example (e.g., example 1) or to any of the examples described herein, further comprising that the circuitry is configured to receive the first activation data together with the upstream data of the at least one second distributed unit (100) during the first time window.

Another example (e.g., example 3) relates to a previously described example (e.g., one of the examples 1 to 2) or to any of the examples described herein, further comprising that the circuitry is configured to receive the first activation data and the upstream data of the at least one second distributed unit (100) via the same channel of the TDM P2MP network.

Another example (e.g., example 4) relates to a previously described example (e.g., one of the examples 1 to 3) or to any of the examples described herein, further comprising that the first activation data is a predetermined data pattern that is received at least partially superimposed on the upstream data of the at least one second distributed unit (100).

Another example (e.g., example 5) relates to a previously described example (e.g., example 4) or to any of the examples described herein, further comprising that the predetermined data pattern is a noise pattern.

Another example (e.g., example 6) relates to a previously described example (e.g., one of the examples 4 to 5) or to any of the examples described herein, further comprising that the predetermined data pattern is one of a preamble pattern and an alternating pattern.

Another example (e.g., example 7) relates to a previously described example (e.g., one of the examples 1 to 6) or to any of the examples described herein, further comprising that the circuitry is configured to receive the upstream data from the at least one second distributed unit (100), and to detect the first activation data superimposed over the upstream data of the at least one second distributed unit (100).

Another example (e.g., example 8) relates to a previously described example (e.g., example 7) or to any of the examples described herein, further comprising that the circuitry is configured to attempt to decode the upstream data being superimposed with the first activation data, and to provide a retransmission request to the at least one second distributed unit (100) in case the upstream data being superimposed with the first activation data cannot be decoded.

Another example (e.g., example 9) relates to a previously described example (e.g., one of the examples 1 to 8) or to any of the examples described herein, further comprising that the circuitry is configured to detect the first activation data by detecting errors within the upstream data transmitted by the at least one second distributed unit (100).

Another example (e.g., example 10) relates to a previously described example (e.g., one of the examples 1 to 9) or to any of the examples described herein, further comprising that a received signal level of the upstream data is at most 20% larger or smaller than a received signal level of the first activation data.

Another example (e.g., example 11) relates to a previously described example (e.g., one of the examples 1 to 9) or to any of the examples described herein, further comprising that a received signal level of the upstream data is at least 20% larger than a received signal level of the first activation data.

Another example (e.g., example 12) relates to a previously described example (e.g., one of the examples 1 to 11) or to any of the examples described herein, further comprising that a timing of the first activation data within the first time window is based on the round-trip time of the first distributed unit (90) and based on a random delay time.

Another example (e.g., example 13) relates to a previously described example (e.g., one of the examples 1 to 12) or to any of the examples described herein, further comprising that the circuitry is further configured to instruct the at least one second distributed unit (100) to transmit the upstream data with increased error correction capabilities to the central unit (20) during the first time window.

Another example (e.g., example 14) relates to a previously described example (e.g., one of the examples 1 to 13) or to any of the examples described herein, further comprising that the circuitry is further configured to determine a starting time of the second time window based on the estimate for the round-trip time.

Another example (e.g., example 15) relates to a previously described example (e.g., one of the examples 1 to 14) or to any of the examples described herein, further comprising that the second time window is shorter than the first time window.

Another example (e.g., example 16) relates to a previously described example (e.g., example 15) or to any of the examples described herein, further comprising that a length of the second time window is based on a length of the first activation data.

Another example (e.g., example 17) relates to a previously described example (e.g., one of the examples 1 to 16) or to any of the examples described herein, further comprising that the circuitry is configured to determine the estimate for the round-trip time based on a reception start time and/or a reception end time of the first activation data.

Another example (e.g., example 18) relates to a previously described example (e.g., one of the examples 1 to 17) or to any of the examples described herein, further comprising that the circuitry is configured to grant, during the first time window, the first distributed unit (90) to transmit the first activation data to the central unit (20) by transmitting a first grant message over the TDM P2MP network, wherein the first grant message comprises data indicating the first time window.

Another example (e.g., example 19) relates to a previously described example (e.g., one of the examples 1 to 18) or to any of the examples described herein, further comprising that the grant to transmit the first activation data is provided for any distributed unit that is not yet registered to the TDM P2MP network.

Another example (e.g., example 20) relates to a previously described example (e.g., one of the examples 1 to 19) or to any of the examples described herein, further comprising that the circuitry is configured to exclusively grant, during the second time window, the first distributed unit (90) to transmit the second activation data to the central unit (20) by transmitting a second grant message over the TDM P2MP network, wherein the second grant message comprises data indicating the second time window and the exclusive grant to transmit the second activation data to the central unit (20).

Another example (e.g., example 21) relates to a previously described example (e.g., example 20) or to any of the examples described herein, further comprising that the second grant message is part of a transmission map for a transmission frame, wherein the second time window is contained in a time interval allocated for transmitting the transmission frame, wherein the transmission map assigns time outside the second time window and inside the time interval to one or more further distributed units to transmit upstream data.

Another example (e.g., example 22) relates to a previously described example (e.g., one of the examples 1 to 21) or to any of the examples described herein, further comprising that the circuitry is configured to register the first distributed unit (90) to the TDM P2MP network by sending a third message over division multiplexed point-to-multipoint network, wherein the third message comprises data indicating registration information for the first distributed unit (90) in the TDM P2MP network.

Another example (e.g., example 23) relates to a previously described example (e.g., one of the examples 1 to 22) or to any of the examples described herein, further comprising that the TDM P2MP network is a passive optical network.

An example (e.g., example 24) relates to a central unit (20) for a time-division multiplexed (TDM) point-to-multipoint (P2MP) network, the central unit (20) comprising means (e.g., means for processing) configured to grant, during a first time window, a first distributed unit (90) not yet registered to the TDM P2MP network to transmit first activation data to the central unit (20). The central unit (20), e.g., the means, is configured to grant, during the first time window, at least one second distributed unit (100) already registered to the TDM P2MP network to transmit upstream data to the central unit (20). The central unit (20), e.g., the means, is configured to receive the first activation data during the first time window. The central unit (20), e.g., the means, is configured to determine an estimate for a round-trip time of the first distributed unit (90) based on the first activation data. The central unit (20), e.g., the means, is configured to determine a length of a second time window based on the estimate for the round-trip time. The central unit (20), e.g., the means, is configured to grant exclusively the first distributed unit (90) to transmit second activation data to the central unit (20) during the second time window. The central unit (20), e.g., the means, is configured to register the first distributed unit (90) to the TDM P2MP network based on the second activation data.

An example (e.g., example 25) relates to an optical line terminal (200) for a passive optical network, the optical line terminal (200) comprising the central unit (20) according to one of the examples 1 to 24.

An example (e.g., example 26) relates to a method for the central unit (20) of a time-division multiplexed (TDM) point-to-multipoint (P2MP) network, the method comprising granting (210), during a first time window, a first distributed unit (90) not yet registered to the TDM P2MP network to transmit first activation data to the central unit (20). The method comprises granting (215), during the first time window, at least one second distributed unit (100) already registered to the TDM P2MP network to transmit upstream data to the central unit (20). The method comprises receiving (220) the first activation data during the first time window. The method comprises determining (240) an estimate for a round-trip time of the first distributed unit (90) based on the first activation data. The method comprises determining (250) a length of a second time window based on the estimate for the round-trip time. The method comprises granting (260) exclusively the first distributed unit (90) to transmit second activation data to the central unit (20) during the second time window. The method comprises registering (270) the first distributed unit (90) to the TDM P2MP network based on the second activation data.

Another example (e.g., example 27) relates to a previously described example (e.g., example 26) or to any of the examples described herein, further comprising that the method comprises receiving (220; 225) the first activation data together with the upstream data of the at least one second distributed unit (100) during the first time window.

Another example (e.g., example 28) relates to a previously described example (e.g., one of the examples 26 to 27) or to any of the examples described herein, further comprising that the method comprises receiving (220; 225) the first activation data and the upstream data of the at least one second distributed unit (100) via the same channel of the TDM P2MP network.

Another example (e.g., example 29) relates to a previously described example (e.g., one of the examples 26 to 28) or to any of the examples described herein, further comprising that the first activation data is a predetermined data pattern that is received at least partially superimposed on the upstream data of the at least one second distributed unit (100).

Another example (e.g., example 30) relates to a previously described example (e.g., example 29) or to any of the examples described herein, further comprising that the predetermined data pattern is a noise pattern.

Another example (e.g., example 31) relates to a previously described example (e.g., one of the examples 29 to 30) or to any of the examples described herein, further comprising that the predetermined data pattern is one of a preamble pattern and an alternating pattern.

Another example (e.g., example 32) relates to a previously described example (e.g., one of the examples 26 to 31) or to any of the examples described herein, further comprising that the method comprises receiving (225) the upstream data from the at least one second distributed unit (100), and detecting (230) the first activation data superimposed over the upstream data of the at least one second distributed unit (100).

Another example (e.g., example 33) relates to a previously described example (e.g., example 32) or to any of the examples described herein, further comprising that the method comprises attempting (232) to decode the upstream data being superimposed with the first activation data, and providing (234) a retransmission request to the at least one second distributed unit (100) in case the upstream data being superimposed with the first activation data cannot be decoded.

Another example (e.g., example 34) relates to a previously described example (e.g., one of the examples 26 to 33) or to any of the examples described herein, further comprising that the method comprises detecting (230) the first activation data by detecting errors within the upstream data transmitted by the at least one second distributed unit (100).

Another example (e.g., example 35) relates to a previously described example (e.g., one of the examples 26 to 34) or to any of the examples described herein, further comprising that a received signal level of the upstream data is at most 20% larger or smaller than a received signal level of the first activation data.

Another example (e.g., example 36) relates to a previously described example (e.g., one of the examples 26 to 34) or to any of the examples described herein, further comprising that a received signal level of the upstream data is at least 20% larger than a received signal level of the first activation data.

Another example (e.g., example 37) relates to a previously described example (e.g., one of the examples 26 to 36) or to any of the examples described herein, further comprising that a timing of the first activation data within the first time window is based on the round-trip time of the first distributed unit (90) and based on a random delay time.

Another example (e.g., example 38) relates to a previously described example (e.g., one of the examples 26 to 37) or to any of the examples described herein, further comprising that the method further comprises instructing (215) the at least one second distributed unit (100) to transmit the upstream data with increased error correction capabilities to the central unit (20) during the first time window.

Another example (e.g., example 39) relates to a previously described example (e.g., one of the examples 26 to 38) or to any of the examples described herein, further comprising that the method further comprises determining (245) a starting time of the second time window based on the estimate for the round-trip time.

Another example (e.g., example 40) relates to a previously described example (e.g., one of the examples 26 to 39) or to any of the examples described herein, further comprising that the second time window is shorter than the first time window.

Another example (e.g., example 41) relates to a previously described example (e.g., example 40) or to any of the examples described herein, further comprising that a length of the second time window is based on a length of the first activation data.

Another example (e.g., example 42) relates to a previously described example (e.g., one of the examples 26 to 41) or to any of the examples described herein, further comprising that the method comprises determining (240) the estimate for the round-trip time based on a reception start time and/or a reception end time of the first activation data.

Another example (e.g., example 43) relates to a previously described example (e.g., one of the examples 26 to 42) or to any of the examples described herein, further comprising that the method comprises granting (210), during the first time window, the first distributed unit (90) to transmit the first activation data to the central unit (20) by transmitting a first grant message over the TDM P2MP network, wherein the first grant message comprises data indicating the first time window.

Another example (e.g., example 44) relates to a previously described example (e.g., one of the examples 26 to 43) or to any of the examples described herein, further comprising that the grant to transmit the first activation data is provided for any distributed unit that is not yet registered to the TDM P2MP network.

Another example (e.g., example 45) relates to a previously described example (e.g., one of the examples 26 to 44) or to any of the examples described herein, further comprising that the method comprises exclusively granting (260), during the second time window, the first distributed unit (90) to transmit the second activation data to the central unit (20) by transmitting a second grant message over the TDM P2MP network, wherein the second grant message comprises data indicating the second time window and the exclusive grant to transmit the second activation data to the central unit (20).

Another example (e.g., example 46) relates to a previously described example (e.g., example 45) or to any of the examples described herein, further comprising that the second grant message is part of a transmission map for a transmission frame, wherein the second time window is contained in a time interval allocated for transmitting the transmission frame, wherein the transmission map assigns time outside the second time window and inside the time interval to one or more further distributed units to transmit upstream data.

Another example (e.g., example 47) relates to a previously described example (e.g., one of the examples 26 to 46) or to any of the examples described herein, further comprising that the method comprises registering (270) the first distributed unit (90) to the TDM P2MP network by sending a third message over division multiplexed point-to-multipoint network, wherein the third message comprises data indicating registration information for the first distributed unit (90) in the TDM P2MP network.

Another example (e.g., example 48) relates to a previously described example (e.g., one of the examples 26 to 47) or to any of the examples described herein, further comprising that the TDM P2MP network is a passive optical network.

Another example (e.g., example 49) relates to a previously described example (e.g., example 48) or to any of the examples described herein, further comprising that the central unit (20) is an optical line terminal (200) of the passive optical network and that the first (90) and the at least one second distributed unit (100) are optical networking units (900; 1000) of the passive optical network.

An example (e.g., example 50) relates to a distributed unit (90) for a time-division multiplexed (TDM) point-to-multipoint (P2MP) network, the distributed unit comprising circuitry configured to receive a first grant message over the TDM P2MP network from a central unit (20) of the TDM P2MP network, wherein the first grant message comprises data indicating a first time window during which the distributed unit is granted to transmit first activation data for registering at the TDM P2MP network to the central unit (20) concurrently to upstream data of at least one second distributed unit (100) already registered to the TDM P2MP network. The distributed unit (90), e.g., the circuitry, is configured to transmit the first activation data during the first time window. The distributed unit (90), e.g., the circuitry, is configured to receive a second grant message over the TDM P2MP network from the central unit (20), wherein the second grant message comprises data indicating a second time window during which the distributed unit is exclusively granted to transmit second activation data for registering at the TDM P2MP network to the central unit (20). The distributed unit (90), e.g., the circuitry, is configured to transmit the second activation data during the second time window. The distributed unit (90), e.g., the circuitry, is configured to receive a third message comprising data indicating registration information for the distributed unit in the TDM P2MP network.

Another example (e.g., example 51) relates to a previously described example (e.g., example 50) or to any of the examples described herein, further comprising that the circuitry is configured to transmit the first activation data after a first delay time since the reception of the first grant message lapses, wherein the circuitry is configured to transmit the second activation data after a second delay time since the reception of the second grant message lapses, wherein the first delay time is equal to the second delay time.

Another example (e.g., example 52) relates to a previously described example (e.g., one of the examples 50 to 51) or to any of the examples described herein, further comprising that the first activation data is a predetermined data pattern.

Another example (e.g., example 53) relates to a previously described example (e.g., example 52) or to any of the examples described herein, further comprising that the predetermined data pattern is a noise pattern.

Another example (e.g., example 54) relates to a previously described example (e.g., one of the examples 52 to 53) or to any of the examples described herein, further comprising that the predetermined data pattern is one of a preamble pattern and an alternating pattern.

Another example (e.g., example 55) relates to a previously described example (e.g., one of the examples 50 to 54) or to any of the examples described herein, further comprising that the circuitry is configured to transmit the first activation data with a signal level equal to that used for transmitting upstream data to the central unit (20).

Another example (e.g., example 56) relates to a previously described example (e.g., one of the examples 50 to 54) or to any of the examples described herein, further comprising that the circuitry is configured to transmit the first activation data with a signal level that is at least 20% lower than that used for transmitting upstream data to the central unit (20).

Another example (e.g., example 57) relates to a previously described example (e.g., one of the examples 50 to 56) or to any of the examples described herein, further comprising that a length of the first activation data is predefined.

Another example (e.g., example 58) relates to a previously described example (e.g., one of the examples 50 to 57) or to any of the examples described herein, further comprising that a length of the first activation data is equal to a length of the second activation data.

Another example (e.g., example 59) relates to a previously described example (e.g., one of the examples 50 to 58) or to any of the examples described herein, further comprising that a length of the second time window is based on a length of the first activation data.

Another example (e.g., example 60) relates to a previously described example (e.g., one of the examples 50 to 59) or to any of the examples described herein, further comprising that the second activation data indicate a serial number of the distributed unit.

Another example (e.g., example 61) relates to a previously described example (e.g., one of the examples 50 to 60) or to any of the examples described herein, further comprising that the circuitry is configured to transmit the first activation data via the same channel of the TDM P2MP network as used by the at least one second distributed unit (100) for transmitting the upstream data to the central unit (20).

Another example (e.g., example 62) relates to a previously described example (e.g., one of the examples 50 to 61) or to any of the examples described herein, further comprising that the circuitry is configured to transmit the first activation data within the first time window after a random delay time.

Another example (e.g., example 63) relates to a previously described example (e.g., one of the examples 50 to 62) or to any of the examples described herein, further comprising that the TDM P2MP network is a passive optical network.

An example (e.g., example 64) relates to a distributed unit (90) for a time-division multiplexed (TDM) point-to-multipoint (P2MP) network, the distributed unit comprising means (for processing) configured to receive a first grant message over the TDM P2MP network from a central unit (20) of the TDM P2MP network, wherein the first grant message comprises data indicating a first time window during which the distributed unit is granted to transmit first activation data for registering at the TDM P2MP network to the central unit (20) concurrently to upstream data of at least one second distributed unit (100) already registered to the TDM P2MP network. The distributed unit (90), e.g., the means, is configured to transmit the first activation data during the first time window. The distributed unit (90), e.g., the means, is configured to receive a second grant message over the TDM P2MP network from the central unit (20), wherein the second grant message comprises data indicating a second time window during which the distributed unit is exclusively granted to transmit second activation data for registering at the TDM P2MP network to the central unit (20). The distributed unit (90), e.g., the means, is configured to transmit the second activation data during the second time window. The distributed unit (90), e.g., the means, is configured to receive a third message comprising data indicating registration information for the distributed unit in the TDM P2MP network.

An example (e.g., example 65) relates to an optical networking unit (900) for a passive optical network, wherein the optical networking unit comprises the distributed unit (90) according to one of the examples 50 to 64.

An example (e.g., example 66) relates to a passive optical network system comprising the optical line terminal (200) according to example 25 and one or more optical networking units (900;1000) according to example 65.

An example (e.g., example 67) relates to a method for the distributed unit of a time-division multiplexed (TDM) point-to-multipoint (P2MP) network, the method comprising receiving (910) a first grant message over the TDM P2MP network from a central unit (20) of the TDM P2MP network, wherein the first grant message comprises data indicating a first time window during which the distributed unit is granted to transmit first activation data for registering at the TDM P2MP network to the central unit (20) concurrently to upstream data of at least one second distributed unit (100) already registered to the TDM P2MP network. The method comprises transmitting (920) the first activation data during the first time window. The method comprises receiving (930) a second grant message over the TDM P2MP network from the central unit (20), wherein the second grant message comprises data indicating a second time window during which distributed unit is exclusively granted to transmit second activation data for registering at the TDM P2MP network to the central unit (20). The method comprises transmitting (940) the second activation data during the second time window. The method comprises receiving (950) a third message comprising data indicating registration information for the distributed unit in the TDM P2MP network.

Another example (e.g., example 68) relates to a previously described example (e.g., example 67) or to any of the examples described herein, further comprising that the method comprises transmitting (920) the first activation data after a first delay time since the reception of the first grant message lapses, wherein the method comprises transmitting (940) the second activation data after a second delay time since the reception of the second grant message lapses, wherein the first delay time is equal to the second delay time.

Another example (e.g., example 69) relates to a previously described example (e.g., one of the examples 67 to 68) or to any of the examples described herein, further comprising that the first activation data is a predetermined data pattern.

Another example (e.g., example 70) relates to a previously described example (e.g., example 69) or to any of the examples described herein, further comprising that the predetermined data pattern is a noise pattern.

Another example (e.g., example 71) relates to a previously described example (e.g., one of the examples 69 to 70) or to any of the examples described herein, further comprising that the predetermined data pattern is one of a preamble pattern and an alternating pattern.

Another example (e.g., example 72) relates to a previously described example (e.g., one of the examples 67 to 71) or to any of the examples described herein, further comprising that the method comprises transmitting (920) the first activation data with a signal level equal to that used for transmitting upstream data to the central unit (20).

Another example (e.g., example 73) relates to a previously described example (e.g., one of the examples 67 to 71) or to any of the examples described herein, further comprising that the method comprises transmitting (920) the first activation data with a signal level that is at least 20% lower than that used for transmitting upstream data to the central unit (20).

Another example (e.g., example 74) relates to a previously described example (e.g., one of the examples 67 to 73) or to any of the examples described herein, further comprising that a length of the first activation data is predefined.

Another example (e.g., example 75) relates to a previously described example (e.g., one of the examples 67 to 74) or to any of the examples described herein, further comprising that a length of the first activation data is equal to a length of the second activation data.

Another example (e.g., example 76) relates to a previously described example (e.g., one of the examples 67 to 74) or to any of the examples described herein, further comprising that a length of the second time window is based on a length of the first activation data.

Another example (e.g., example 77) relates to a previously described example (e.g., one of the examples 67 to 76) or to any of the examples described herein, further comprising that the second activation data indicate a serial number of the distributed unit.

Another example (e.g., example 78) relates to a previously described example (e.g., one of the examples 67 to 77) or to any of the examples described herein, further comprising that the method comprises transmitting (920) the first activation data via the same channel of the TDM P2MP network as used by the at least one second distributed unit (100) for transmitting the upstream data to the central unit (20).

Another example (e.g., example 79) relates to a previously described example (e.g., one of the examples 67 to 78) or to any of the examples described herein, further comprising that the method comprises transmitting (920) the first activation data within the first time window after a random delay time.

Another example (e.g., example 80) relates to a previously described example (e.g., one of the examples 67 to 79) or to any of the examples described herein, further comprising that the TDM P2MP network is a passive optical network.

An example (e.g., example 81) relates to a machine-readable storage medium including program code, when executed, to cause a machine to perform the method of one of the examples 26 to 49 or the method according to one of the examples 67 to 80.

An example (e.g., example 82) relates to a computer program having a program code for performing the method of one of the examples 26 to 49 or the method according to one of the examples 67 to 80, when the computer program is executed on a computer, a processor, or a programmable hardware component.

An example (e.g., example 83) relates to a machine-readable storage including machine readable instructions, when executed, to implement a method or realize an apparatus as claimed in any pending claim or illustrated in any example or combination of examples.

An example (e.g., example A1) relates to a central unit for a time-division multiplexed point-to-multipoint network, the central unit comprising circuitry configured to grant, during a first time window, a first distributed unit not yet registered to the time-division multiplexed point-to-multipoint network to transmit first activation data to the central unit. The circuitry is configured to grant, during the first time window, at least one second distributed unit already registered to the time-division multiplexed point-to-multipoint network to transmit upstream data to the central unit. The circuitry is configured to receive the first activation data of the first distributed unit during the first time window. The circuitry is configured to determine an estimate for a round-trip time of the first distributed unit based on the first activation data. The circuitry is configured to determine a length of a second time window based on the estimate for the round-trip time. The circuitry is configured to grant exclusively the first distributed unit to transmit second activation data to the central unit during the second time window. The circuitry is configured to register the first distributed unit to the time-division multiplexed point-to-multipoint network based on the second activation data.

Another example (e.g., example A2) relates to a previously described example (e.g., example A1) or to any of the examples described herein, further comprising that the circuitry is further configured to determine a starting time of the second time window based on the estimate for the round-trip time.

Another example (e.g., example A3) relates to a previously described example (e.g., example A1 or A2) or to any of the examples described herein, further comprising that the circuitry is configured to determine the estimate for the round-trip time based on a reception start time and a reception end time of the first activation data.

Another example (e.g., example A4) relates to a previously described example (e.g., one of the examples A1 to A3) or to any of the examples described herein, further comprising that the circuitry is configured to receive the first activation data together with the upstream data of the at least one second distributed unit during the first time window.

Another example (e.g., example A5) relates to a previously described example (e.g., one of the examples A1 to A4) or to any of the examples described herein, further comprising that the circuitry is configured to grant, during the first time window, the first distributed unit to transmit the first activation data to the central unit by transmitting a first grant message over the time-division multiplexed point-to-multipoint network, wherein the first grant message comprises data indicating the first time window.

Another example (e.g., example A6) relates to a previously described example (e.g., one of the examples A1 to A5) or to any of the examples described herein, further comprising that the circuitry is configured to exclusively grant, during the second time window, the first distributed unit to transmit the second activation data to the central unit by transmitting a second grant message over the time-division multiplexed point-to-multipoint network, wherein the second grant message comprises data indicating the second time window and the exclusive grant to transmit the second activation data to the central unit.

Another example (e.g., example A7) relates to a previously described example (e.g., one of the examples A1 to A6) or to any of the examples described herein, further comprising that the circuitry is configured to register the first distributed unit to the time-division multiplexed point-to-multipoint network by sending a third grant message over division multiplexed point-to-multipoint network, wherein the third grant message comprises data indicating registration information for the first distributed unit in the time-division multiplexed point-to-multipoint network.

Another example (e.g., example A8) relates to a previously described example (e.g., one of the examples A1 to A7) or to any of the examples described herein, further comprising that the circuitry is configured to receive the first activation data of the first distributed unit and the upstream data of the at least one second distributed unit via the same channel of the time-division multiplexed point-to-multipoint network.

Another example (e.g., example A9) relates to a previously described example (e.g., one of the examples A1 to A8) or to any of the examples described herein, further comprising that the circuitry is further configured to instruct the at least one second distributed unit to transmit the upstream data with increased error correction capabilities to the central unit during the first time window.

Another example (e.g., example A10) relates to a previously described example (e.g., one of the examples A1 to A9) or to any of the examples described herein, further comprising that the time-division multiplexed point-to-multipoint network is a passive optical network.

An example (e.g., example A11) relates to a method for a central unit of a time-division multiplexed point-to-multipoint network, the method comprising granting, during a first time window, a first distributed unit not yet registered to the time-division multiplexed point-to-multipoint network to transmit first activation data to the central unit. The method comprises granting, during the first time window, at least one second distributed unit already registered to the time-division multiplexed point-to-multipoint network to transmit upstream data to the central unit. The method comprises receiving the first activation data of the first distributed unit during the first time window. The method comprises determining an estimate for a round-trip time of the first distributed unit based on the first activation data. The method comprises determining a length of a second time window based on the estimate for the round-trip time. The method comprises granting exclusively the first distributed unit to transmit second activation data to the central unit during the second time window. The method comprises registering the first distributed unit to the time-division multiplexed point-to-multipoint network based on the second activation data.

An example (e.g., example A12) relates to a distributed unit for a time-division multiplexed point-to-multipoint network, the distributed unit comprising circuitry configured to receive a first grant message over the time-division multiplexed point-to-multipoint network from a central unit of the time-division multiplexed point-to-multipoint network, wherein the first grant message comprises data indicating a first time window during which the distributed unit is granted to transmit first activation data for registering at the time-division multiplexed point-to-multipoint network to the central unit concurrently to upstream data of at least one second distributed unit already registered to the time-division multiplexed point-to-multipoint network. The circuitry is configured to transmit the first activation data during the first time window. The circuitry is configured to receive a second grant message over the time-division multiplexed point-to-multipoint network from the central unit, wherein the second grant message comprises data indicating a second time window during which the distributed unit is exclusively granted to transmit second activation data for registering at the time-division multiplexed point-to-multipoint network to the central unit. The circuitry is configured to transmit the second activation data during the first time window. The circuitry is configured to receive a third grant message comprising data indicating registration information for the first distributed unit in the time-division multiplexed point-to-multipoint network.

Another example (e.g., example A13) relates to a previously described example (e.g., example A12) or to any of the examples described herein, further comprising that the circuitry is configured to transmit the first activation data after a first delay time since the reception of the first grant message lapses, wherein the circuitry is configured to transmit the second activation data after a second delay time since the reception of the second grant message lapses, wherein the first delay time is equal to the second delay time.

Another example (e.g., example A14) relates to a previously described example (e.g., example A12) or to any of the examples described herein, further comprising that the first activation data is a predetermined data pattern.

Another example (e.g., example A15) relates to a previously described example (e.g., one of the examples A12 to A14) or to any of the examples described herein, further comprising that the circuitry is configured to transmit the first activation data with a signal level equal to that used for transmitting user data to the central unit, or wherein the circuitry is configured to transmit the first activation data with a signal level lower than that used for transmitting user data to the central unit Another example (e.g., example A16) relates to a previously described example (e.g., one of the examples A12 to A15) or to any of the examples described herein, further comprising that a length of the first activation data is predefined, and/or wherein the length of the first activation data is equal to a length of the second activation data.

Another example (e.g., example A17) relates to a previously described example (e.g., one of the examples A12 to A16) or to any of the examples described herein, further comprising that the second activation data indicate a serial number of the distributed unit.

Another example (e.g., example A18) relates to a previously described example (e.g., one of the examples A12 to A17) or to any of the examples described herein, further comprising that the circuitry is configured to transmit the first activation data via the same channel of the time-division multiplexed point-to-multipoint network as used by the at least one second distributed unit for transmitting the upstream data to the central unit.

Another example (e.g., example A19) relates to a previously described example (e.g., one of the examples A12 to A18) or to any of the examples described herein, further comprising that the time-division multiplexed point-to-multipoint network is a passive optical network.

An example (e.g., example A20) relates to a method for a distributed unit of a time-division multiplexed point-to-multipoint network, the method comprising receiving a first grant message over the time-division multiplexed point-to-multipoint network from a central unit of the time-division multiplexed point-to-multipoint network, wherein the first grant message comprises data indicating a first time window during which the distributed unit is granted to transmit first activation data for registering at the time-division multiplexed point-to-multipoint network to the central unit concurrently to upstream data of at least one second distributed unit already registered to the time-division multiplexed point-to-multipoint network. The method comprises transmitting the first activation data during the first time window. The method comprises receiving a second grant message over the time-division multiplexed point-to-multipoint network from the central unit, wherein the second grant message comprises data indicating a second time window during which the distributed unit is exclusively granted to transmit second activation data for registering at the time-division multiplexed point-to-multipoint network to the central unit. The method comprises transmitting the second activation data during the first time window. The method comprises receiving a third grant message comprising data indicating registration information for the first distributed unit in the time-division multiplexed point-to-multipoint network.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F) PLAs), (field) programmable gate arrays ((F) PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Further more, features of a claim should also be included for any other independent claim, even if that claim is not directly defined as dependent on that other independent claim.

What is claimed is:

1. A central unit for a time-division multiplexed (TDM) point-to-multipoint (P2MP) network, the central unit comprising interface and processing circuitry configured to:
grant, during a first time window, a first distributed unit not yet registered to the TDM P2MP network to transmit first activation data to the central unit;
grant, during the first time window, at least one second distributed unit already registered to the TDM P2MP to transmit upstream data to the central unit;
receive the first activation data during the first time window, wherein the first activation data is a predetermined data pattern that is received at least partially superimposed on the upstream data of the at least one second distributed unit, wherein the predetermined data pattern is a noise pattern;
determine an estimate for a round-trip time of the first distributed unit based on the first activation data and a length of a second time window based on the estimate for the round-trip time;
grant exclusively the first distributed unit to transmit second activation data to the central unit during the second time window; and
register the first distributed unit to the TDM P2MP network based on the second activation data.

2. The central unit according to claim 1, wherein the circuitry is configured to receive the upstream data from the at least one second distributed unit, and to detect the first activation data superimposed over the upstream data of the at least one second distributed unit.

3. The central unit according to claim 2, wherein the circuitry is configured to attempt to decode the upstream data being superimposed with the first activation data, and to provide a retransmission request to the at least one second distributed unit in case the upstream data being superimposed with the first activation data cannot be decoded.

4. The central unit according to claim 1, wherein the circuitry is configured to detect the first activation data by detecting errors within the upstream data transmitted by the at least one second distributed unit.

5. The central unit according to claim 1, wherein a received signal level of the upstream data is at most 20% larger or smaller than a received signal level of the first activation data.

6. The central unit according to claim 1, wherein a received signal level of the upstream data is at least 20% larger than a received signal level of the first activation data.

7. The central unit according to claim 1, wherein the circuitry is further configured to instruct the at least one second distributed unit to transmit the upstream data with increased error correction capabilities to the central unit during the first time window, wherein the increased error-correction capabilities comprising at least one of:
using a forward-error-correction codeword with a lower code-rate;
repeating the forward-error-correction codeword within the same upstream data;
shortening a payload portion of the upstream data relative to other data transmitted outside the first time window;
restricting the upstream data to data with a high quality of service requirement; and
reducing a size of an upstream grant.

8. The central unit according to claim 1, wherein the second time window is shorter than the first time window.

9. The central unit according to claim 8, wherein a length of the second time window is based on a length of the first activation data.

10. The central unit according to claim 1, wherein the circuitry is configured to determine the estimate for the round-trip time based on a reception start time and/or a reception end time of the first activation data.

11. The central unit according to claim 1, wherein the TDM P2MP network is a passive optical network.

12. A method for the central unit of a time-division multiplexed (TDM) point-to-multipoint (P2MP) network, the method comprising:
granting, during a first time window, a first distributed unit not yet registered to the TDM P2MP network to transmit first activation data to the central unit;
granting, during the first time window, at least one second distributed unit already registered to the TDM P2MP network to transmit upstream data to the central unit;
receiving the first activation data during the first time window, wherein the first activation data is a predetermined data pattern that is received at least partially superimposed on the upstream data of the at least one second distributed unit, wherein the predetermined data pattern is a noise pattern;
determining an estimate for a round-trip time of the first distributed unit based on the first activation data;
determining a length of a second time window based on the estimate for the round-trip time;
granting exclusively the first distributed unit to transmit second activation data to the central unit during the second time window; and
registering the first distributed unit to the TDM P2MP network based on the second activation data.

13. A non-transitory, computer-readable storage medium including program code that, when executed on a computer, processor, or programmable hardware component, to cause the computer, processor, or programmable hardware component to perform the method of claim 12.

14. A distributed unit for a time-division multiplexed (TDM) point-to-multipoint (P2MP) network, the distributed unit comprising interface and processing circuitry configured to:
receive a first grant message over the TDM P2MP network from a central unit of the TDM P2MP network, wherein the first grant message comprises data indicating a first time window during which the distributed unit is granted to transmit first activation data for registering at the TDM P2MP network to the central unit concurrently to upstream data of at least one second distributed unit already registered to the TDM P2MP network, wherein the first activation data is a predetermined noise pattern;
transmit the first activation data during the first time window;
receive a second grant message over the TDM P2MP network from the central unit, wherein the second grant message comprises data indicating a second time window during which the distributed unit is exclusively granted to transmit second activation data for registering at the TDM P2MP network to the central unit;
transmit the second activation data during the second time window; and
receive a third message comprising data indicating registration information for the distributed unit in the TDM P2MP network.

15. The distributed unit according to claim 14, wherein the circuitry is configured to transmit the first activation data after a first delay time since the reception of the first grant message lapses, wherein the circuitry is configured to transmit the second activation data after a second delay time since the reception of the second grant message lapses, wherein the first delay time is equal to the second delay time.

16. The distributed unit according to claim 14, wherein the circuitry is configured to transmit the first activation data with a signal level equal to that used for transmitting the upstream data of at least one second distributed unit to the central unit.

17. The distributed unit according to claim 14, wherein the circuitry is configured to transmit the first activation data with a signal level that is at least 20% lower than that used for transmitting the upstream data of at least one second distributed unit to the central unit.

18. The distributed unit according to claim 14, wherein a length of the first activation data is equal to a length of the second activation data.

19. The distributed unit according to claim 14, wherein the second activation data indicate a serial number of the distributed unit.

20. The distributed unit according to claim 14, wherein the circuitry is configured to transmit the first activation data via the same channel of the TDM P2MP network as used by the at least one second distributed unit for transmitting the upstream data to the central unit.

21. A method for the distributed unit of a time-division multiplexed (TDM) point-to-multipoint (P2MP) network, the method comprising:

receiving a first grant message over the TDM P2MP network from a central unit of the TDM P2MP network, wherein the first grant message comprises data indicating a first time window during which the distributed unit is granted to transmit first activation data for registering at the TDM P2MP network to the central unit concurrently to upstream data of at least one second distributed unit already registered to the TDM P2MP network, wherein the first activation data is a predetermined noise pattern;

transmitting the first activation data during the first time window;

receiving a second grant message over the TDM P2MP network from the central unit, wherein the second grant message comprises data indicating a second time window during which distributed unit is exclusively granted to transmit second activation data for registering at the TDM P2MP network to the central unit;

transmitting the second activation data during the second time window; and receiving a third message comprising data indicating registration information for the distributed unit in the TDM P2MP network.

22. A non-transitory, computer-readable storage medium including program code that, when executed on a computer, processor, or programmable hardware component, to cause the computer, processor, or programmable hardware component to perform the method of claim 21.

* * * * *